(12) United States Patent
Matsumoto et al.

(10) Patent No.: US 12,218,560 B2
(45) Date of Patent: Feb. 4, 2025

(54) ELECTRIC POWER UNIT

(71) Applicant: HONDA MOTOR CO., LTD., Tokyo (JP)

(72) Inventors: Takuya Matsumoto, Saitama (JP); Yuko Nishi, Saitama (JP); Naoki Matsunaga, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 317 days.

(21) Appl. No.: 17/691,598

(22) Filed: Mar. 10, 2022

(65) Prior Publication Data
US 2022/0294306 A1   Sep. 15, 2022

(30) Foreign Application Priority Data
Mar. 11, 2021   (JP) .................................. 2021-039590

(51) Int. Cl.
   *H02K 5/20*     (2006.01)
   *H02K 5/18*     (2006.01)
   *H02K 9/06*     (2006.01)

(52) U.S. Cl.
   CPC .............. *H02K 5/207* (2021.01); *H02K 5/18* (2013.01); *H02K 9/06* (2013.01)

(58) Field of Classification Search
   CPC . H02K 5/18; H02K 9/06; H02K 11/33; H02K 9/04; H02K 9/02; H02K 5/207
   (Continued)

(56) References Cited

U.S. PATENT DOCUMENTS

| 5,763,969 A | 6/1998 | Metheny et al. |
| 6,364,004 B1 * | 4/2002 | Ehrmann .............. H02K 11/33 |
| | | 123/41.31 |

(Continued)

FOREIGN PATENT DOCUMENTS

| DE | 112019007545 T5 | 3/2022 |
| JP | S61-102149 A | 5/1986 |

(Continued)

OTHER PUBLICATIONS

May 26, 2023, Translation of German Office Action issued for related DE Application No. 10 2022 105 376.8.
(Continued)

*Primary Examiner* — Terrance L Kenerly
*Assistant Examiner* — Theodore L Perkins
(74) *Attorney, Agent, or Firm* — Paratus Law Group, PLLC

(57) ABSTRACT

An electric power unit includes: a rotary electric machine unit an electrical unit disposed above the rotary electric machine unit; and a cooling unit. The electrical unit includes a protrusion protruding outward from a left end portion of the rotary electric machine housing portion of the rotary electric machine in a left-right direction. The cooling unit includes: a cooling fan configured to generate cooling air by rotating integrally with a rotary shaft of the rotary electric machine; and an air guide unit configured to guide the cooling air. The air guide unit includes cooling air flow paths provided between the cooling fan and the electrical unit. The closer to the protrusion of the electrical unit a cooling air flow path is disposed, the larger opening area of the introduction port the cooling air flow path has.

8 Claims, 6 Drawing Sheets

(58) Field of Classification Search
USPC .......................................................... 310/62
See application file for complete search history.

(56) References Cited

U.S. PATENT DOCUMENTS

| | | | |
|---|---|---|---|
| 9,425,656 B2* | 8/2016 | Rasch | H02K 1/20 |
| 9,973,060 B2* | 5/2018 | Aso | F04D 25/06 |
| 2015/0076942 A1* | 3/2015 | Madsen Obel | H02K 9/06 |
| | | | 310/59 |
| 2016/0020665 A1* | 1/2016 | Vohlgemuth | H02K 9/06 |
| | | | 310/62 |
| 2022/0247276 A1 | 8/2022 | Antunes Cezario et al. | |

FOREIGN PATENT DOCUMENTS

| | | |
|---|---|---|
| JP | H11-234954 A | 8/1999 |
| JP | 2008-125172 A | 5/2008 |
| WO | WO 2020/202391 A1 | 10/2020 |

OTHER PUBLICATIONS

Jun. 11, 2024, Translation of Japanese Office Action issued for related JP Application No. 2021-039590.

\* cited by examiner

ELECTRIC POWER UNIT

CROSS REFERENCE TO RELATED APPLICATIONS

This application claims priority to Japanese Patent Application No. 2021-039590 filed on Mar. 11, 2021, the content of which is incorporated herein by reference.

TECHNICAL FIELD

The present invention relates to an electric power unit.

BACKGROUND ART

Recently, with an increase in exhaust gas regulation, environmental regulation, and the like, there is an increasing need to use an electric power unit as a drive source in a construction machine such as a compactor or a working machine such as a lawn mower. Such an electric power unit includes, for example, a rotary electric machine and an electrical unit that controls the rotary electric machine. Since the rotary electric machine and the electrical unit generate heat during driving, the electric power unit preferably includes a cooling unit for cooling the rotary electric machine and the electrical unit.

For example, WO2020/202391 discloses an electric power unit including a motor device, a battery, a control unit that controls a motor of the motor device, and a cooling mechanism for cooling the motor device and the control unit. The cooling mechanism of the electric power unit of WO2020/202391 includes a fan and a cover member. The fan is rotatably supported by a shaft member of the motor and rotates to blow, in a centrifugal direction, gas taken in from an axial direction of the shaft member. The cover member covers the fan so that the gas blown in the centrifugal direction from the fan flows along an outer surface of the motor. Further, in the electric power unit of WO2020/202391, in order to cool a control unit that is an external mechanism of the motor device, the cover member has an outlet through which a part of the gas blown in the centrifugal direction from the fan is blown out in the centrifugal direction.

In the electric power unit of WO2020/202391, since a rotor of the motor rotates clockwise when viewed from a +X direction side, cooling air generated by the fan of the cooling mechanism flows toward a +Z direction on a −Y direction side of a rotary shaft. Therefore, since the cooling air is not easily supplied to a −Z direction side of a control unit disposed on the −Y direction side of the motor device, when the control unit has a protrusion protruding from the motor device to the −Z direction side, there is a problem that it is difficult to cool the protrusion protruding from the motor device to the −Z direction side.

An object of the present invention is to provide an electric power unit capable of effectively cooling a protrusion of an electrical unit.

SUMMARY OF INVENTION

An aspect of the present invention provides an electric power unit including: a rotary electric machine unit; an electrical unit disposed outside the rotary electric machine unit; and a cooling unit. The rotary electric machine unit further includes: a rotary electric machine having a stator and a rotor; a rotary electric machine case having a rotary electric machine housing portion accommodating the rotary electric machine; and a rotary shaft configured to rotate integrally with the rotor. The rotary electric machine housing portion includes: a peripheral wall portion covering an outer peripheral surface of the rotary electric machine; a first end wall portion covering one axial end side of the rotary electric machine in an axial direction; and a second end wall portion covering another axial end side in the axial direction, and the rotary shaft is inserted through the rotary electric machine housing portion and protrudes from the first end wall portion to the one axial end side. The electrical unit is disposed outside the peripheral wall portion of the rotary electric machine housing portion when viewed from the axial direction and disposed at a position at which at least a part of the electrical unit overlaps the rotary electric machine housing portion in the axial direction. The electrical unit includes a protrusion, when viewed from the axial direction, the protrusion protruding outward from one end portion of the rotary electric machine housing portion in a second direction orthogonal to a first direction, the first direction being a direction in which the electrical unit is disposed with respect to the rotary electric machine housing portion. The cooling unit includes: a cooling fan configured to generate cooling air; and an air guide unit configured to guide the cooling air. The cooling fan is provided on an axially outer side of the one axial end side of the rotary electric machine housing portion and configured to rotate integrally with the rotary shaft, and the air guide unit includes cooling air flow paths provided between the cooling fan and the electrical unit when viewed from the axial direction. The cooling air flow paths include introduction ports opened toward the cooling fan and discharge ports opened toward the electrical unit when viewed from the axial direction, and the closer to the protrusion of the electrical unit a cooling air flow path is disposed, the larger opening area of the introduction port the cooling air flow path has.

DESCRIPTION OF EMBODIMENTS

Figure 1:
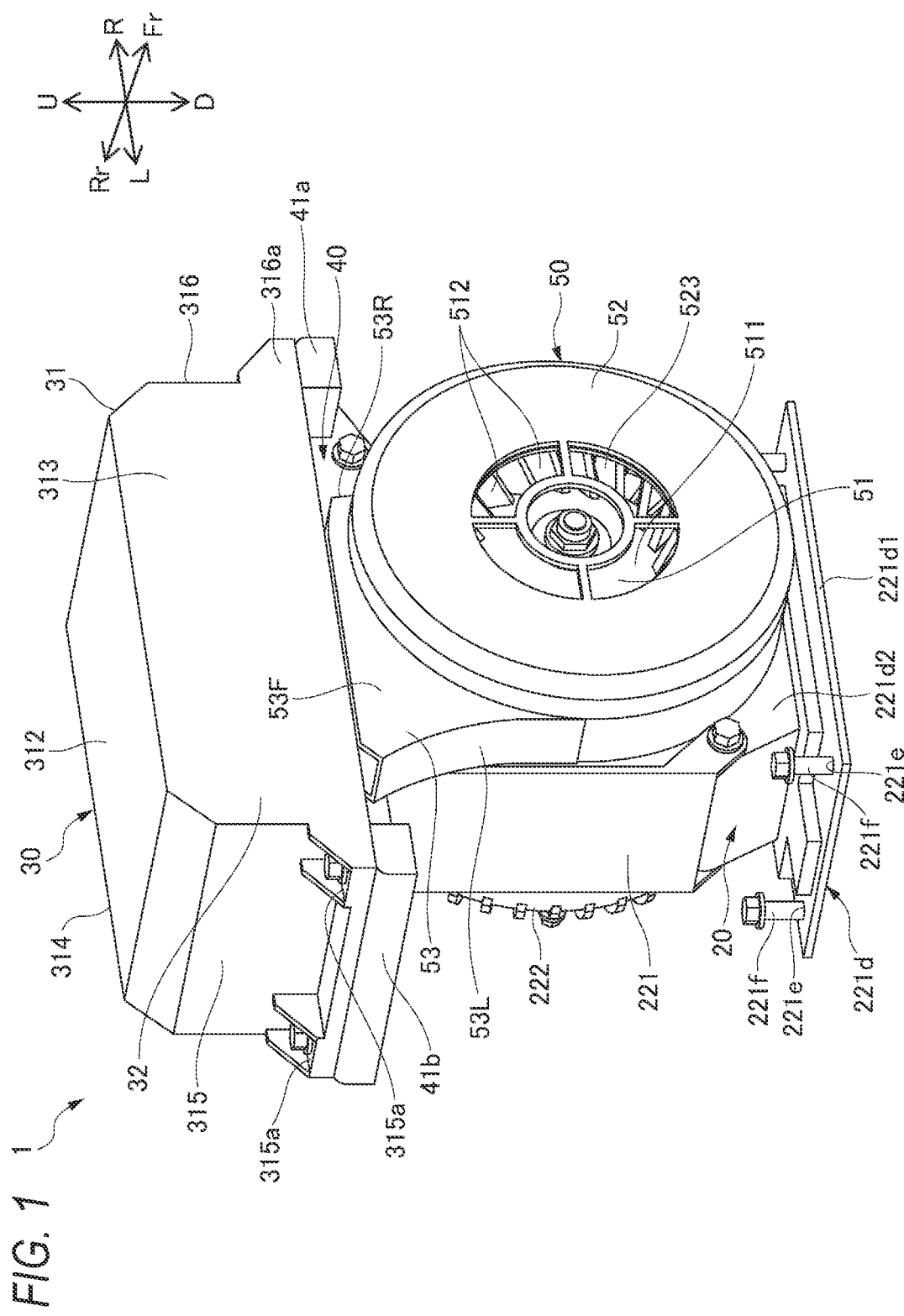
FIG. 1 is a perspective view of an electric power unit according to an embodiment of the present invention as viewed obliquely from above.

Hereinafter, an embodiment of an electric power unit of the present invention will be described with reference to the accompanying drawings. It should be noted that the drawings are viewed in directions of reference numerals.

As shown in FIG. 1, an electric power unit 1 of the present embodiment includes a rotary electric machine unit 20, an electrical unit 30 disposed outside the rotary electric machine unit, a support member 40 for attaching the electrical unit 30 to the rotary electric machine unit 20, and a cooling unit 50. In the present embodiment, the electrical unit 30 is disposed above the rotary electric machine unit 20, and is supported above the rotary electric machine unit 20 via the support member 40. The cooling unit 50 is disposed in front of the rotary electric machine unit 20.

<Rotary Electric Machine Unit>

As shown in FIGS. 2 to 5, the rotary electric machine unit 20 includes a rotary electric machine 21 having a stator 211 and a rotor 212, a rotary electric machine case 22 having a rotary electric machine housing portion 220 that accommodates the rotary electric machine 21, a rotary shaft 23 that rotates integrally with the rotor 212, and an internal fan 24 that is accommodated in the rotary electric machine housing portion 220 and cools the rotary electric machine 21 inside the rotary electric machine housing portion 220. In the present embodiment, an axial direction of the rotary shaft 23, that is, an axial direction of the rotary electric machine 21 extends in a horizontal direction.

In the present description and the like, in order to simplify and clarify the explanation, the axial direction of the rotary shaft 23, that is, the axial direction of the rotary electric machine 21 is defined as a front-rear direction, one axial end side of the rotary electric machine 21 in the axial direction is defined as a front side, and the other axial end side is defined as a rear side. Further, when viewed from the axial direction of the rotary electric machine 21, that is, the front-rear direction, a direction orthogonal to an up-down direction, which is an arrangement direction of the electrical unit 30 as viewed from the rotary shaft 23, is defined as a left-right direction. In the drawings, the front side, the rear side, a left side, a right side, an upper side, and a lower side of the electric power unit 1 are indicated by Fr, Rr, R, U, and D. The front-rear, up-down, and left-right directions defined in the present description are merely defined for convenience, and are irrelevant to the front-rear, up-down, left-right directions of a product on which the electric power unit 1 is mounted. Therefore, when the electric power unit 1 is mounted on a product, a direction of the electric power unit 1 may coincide with or may be different from the front-rear, up-down, and left-right directions of the product. That is, the electric power unit 1 may be mounted on a product such that the axial direction of the rotary electric machine 21 is the up-down direction or the left-right direction, or may be mounted on a product such that the axial direction of the rotary electric machine 21 is a direction inclined from the front-rear direction, the up-down direction, and the left-right direction.

In the present description and the like, unless otherwise specified, terms "axial direction", "radial direction", and "circumferential direction" refer to directions based on the axial direction of the rotary electric machine 21. An axially inner side refers to a center side of the electric power unit 1 in the axial direction, and an axially outer side refers to a side away from a center of the electric power unit 1 in the axial direction.

(Rotary Electric Machine)

Figure 2:
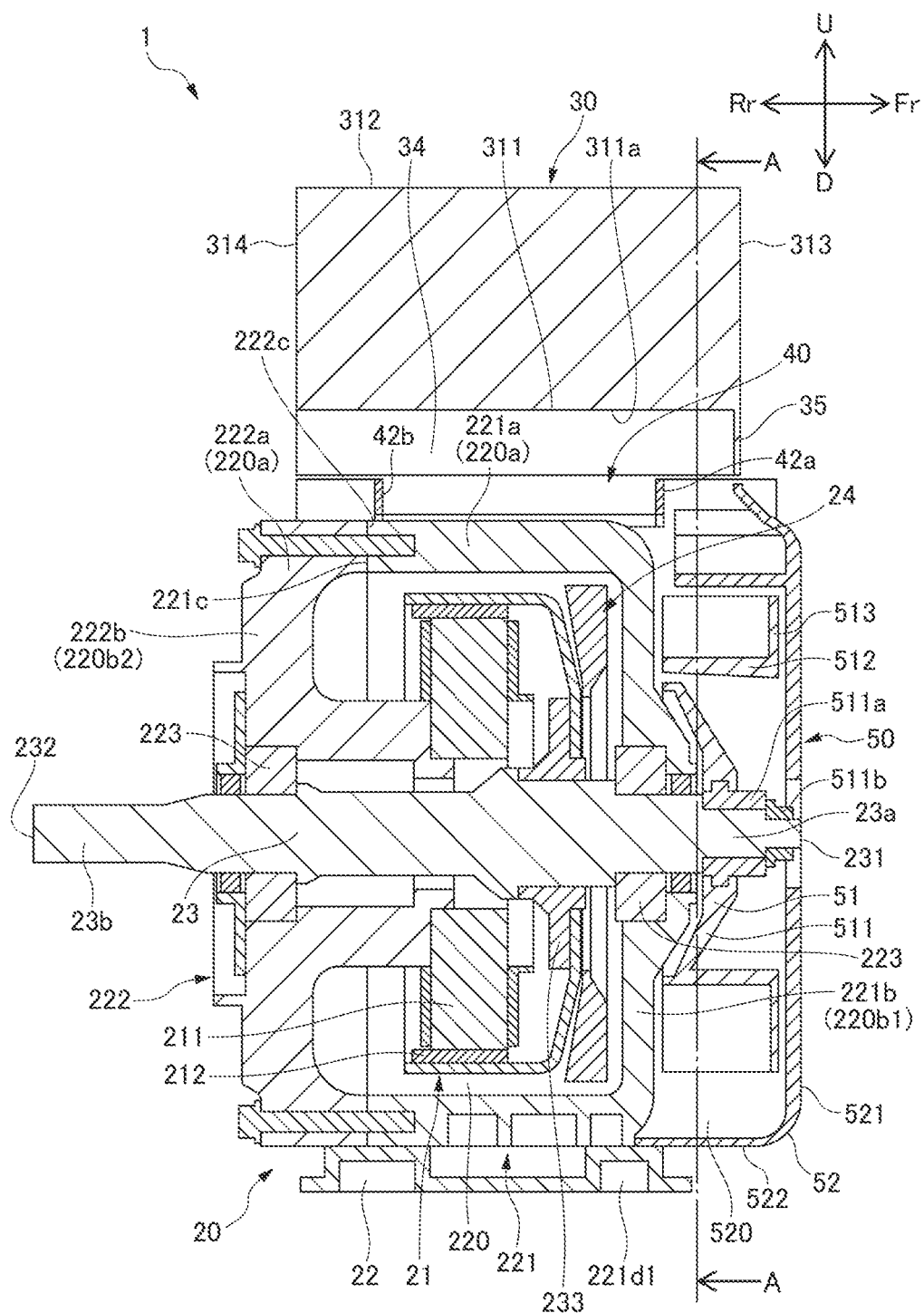
FIG. 2 is a cross-sectional view of a central portion of the electric power unit of FIG. 1 in a left-right direction.
Figure 3:
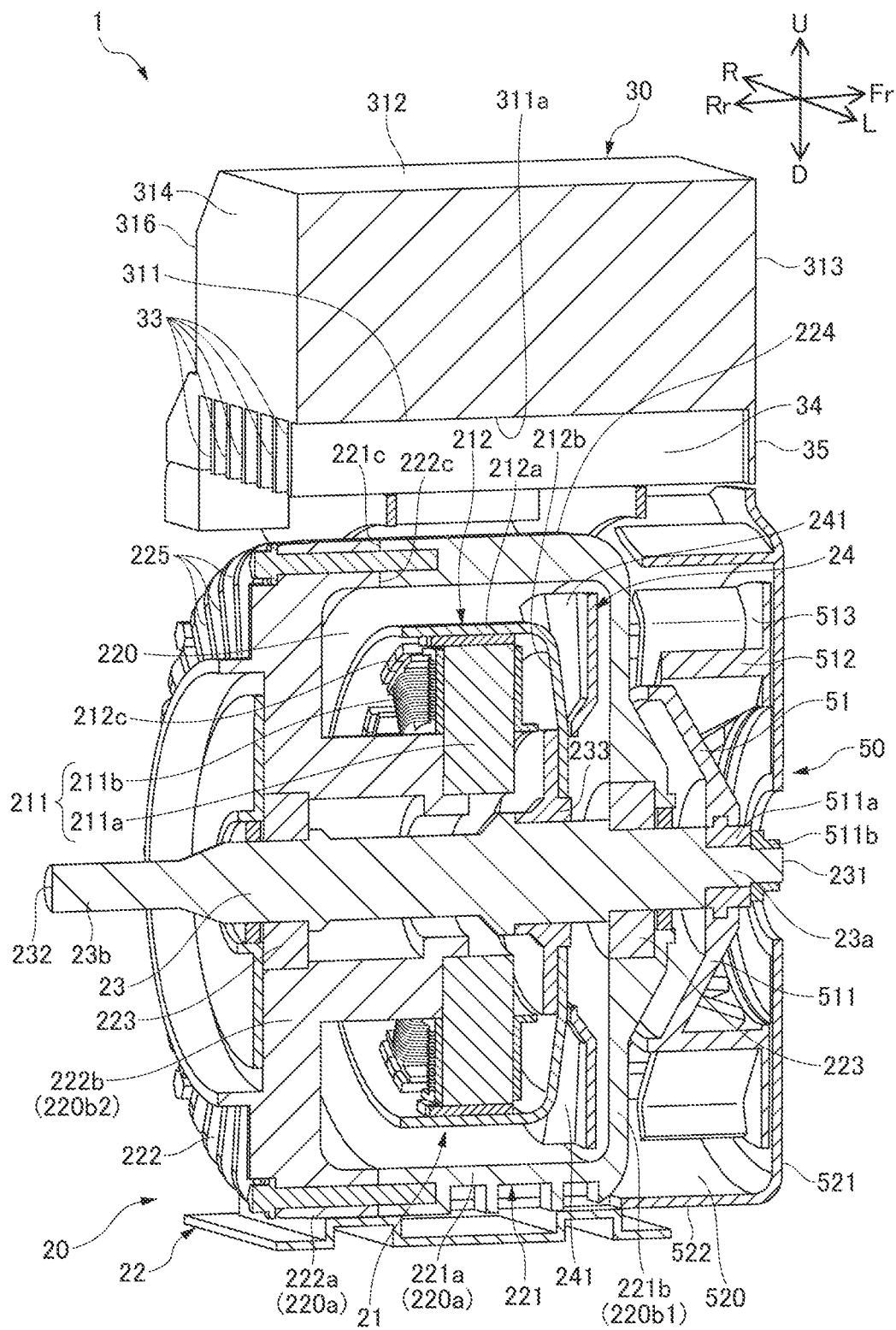
FIG. 3 is a cross-sectional perspective view of FIG. 2.
Figure 4:
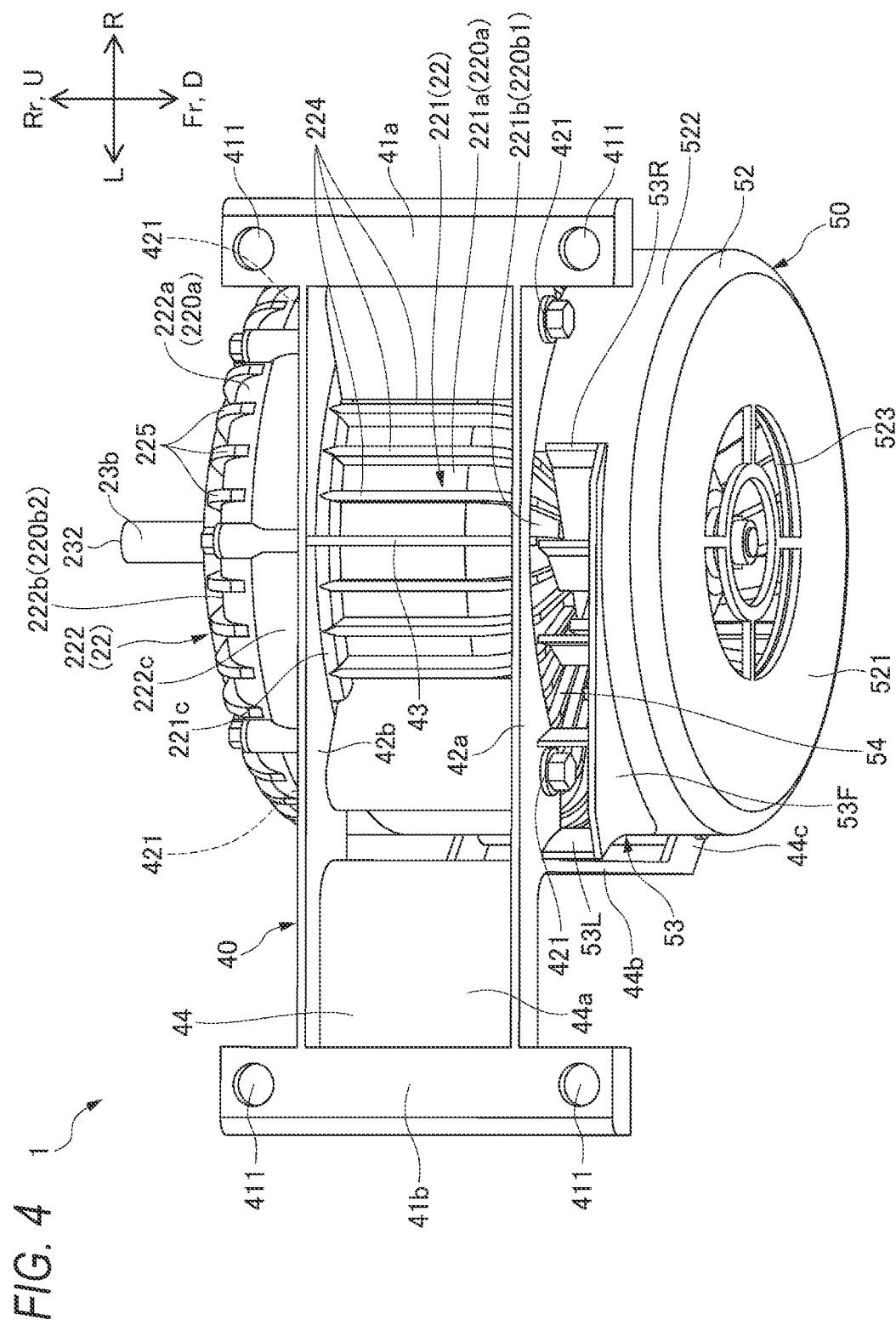
FIG. 4 is a perspective view of the electric power unit of FIG. 1 when viewed obliquely from above in a state in which an electrical unit is removed.

As shown in FIGS. 2 and 3, the rotary electric machine 21 includes the stator 211 and the rotor 212 as described above. In the present embodiment, the rotary electric machine 21 is an outer rotor type rotary electric machine in which the rotor 212 is disposed outside the stator 211 in a radial direction of the rotary electric machine 21.

The stator 211 has a substantially annular shape extending in the axial direction, and is accommodated in the rotary electric machine housing portion 220. The rotary shaft 23 is inserted through an annular inside of the stator 211. The stator 211 includes a stator yoke 211a having a substantially annular shape and a coil 211b attached to the stator yoke 211a. The stator yoke 211a is fixed to the rotary electric machine case 22. A plurality of coils 211b are provided along a circumferential direction of the rotary electric machine 21 so as to surround the rotary shaft 23.

The rotor 212 is accommodated in the rotary electric machine housing portion 220 of the rotary electric machine case 22. The rotor 212 is disposed to surround an outer peripheral surface of the stator 211. That is, the rotor 212 is disposed such that the stator 211 is positioned in the annular inside of the rotor 212.

The rotor 212 includes a rotor yoke 212a having a substantially annular shape, an end wall portion 212b extending from a front end portion of the rotor yoke 212a toward a radially inner side of the rotary electric machine 21, and a permanent magnet 212c attached to an inner peripheral surface of the rotor yoke 212a. A plurality of permanent magnets 212c are attached to the inner peripheral surface of the rotor yoke 212a along the circumferential direction of the rotary electric machine 21 so as to surround the stator 211.

(Rotary Electric Machine Case)

As shown in FIGS. 2 to 5, the rotary electric machine case 22 is made of a material having high thermal conductivity and high rigidity, for example, metal.

The rotary electric machine case 22 includes a case body 221 and a cover member 222. Both the case body 221 and the cover member 222 are made of the material having high thermal conductivity and high rigidity, for example, metal.

The case body 221 includes a peripheral wall portion 221a having a substantially hollow cylindrical shape and extending in the axial direction, and an end wall portion 221b extending radially inward from a front end portion of the peripheral wall portion 221a and covering a front side of the rotary electric machine 21 in the axial direction. Therefore, the front end portion of the peripheral wall portion 221a is closed by the end wall portion 221b, and an opening 221c opened rearward is formed in a rear end portion of the peripheral wall portion 221a. The opening 221c has a flange shape protruding radially outward from the peripheral wall portion 221a at the rear end portion of the peripheral wall portion 221a.

The case body 221 further includes a base 221d. The base 221d includes a pedestal portion 221d1 that extends in the front-rear direction and the left-right direction below the peripheral wall portion 221a, and a connecting portion 221d2 that extends upward from the pedestal portion 221d1 and connects the pedestal portion 221d1 and the peripheral wall portion 221a. The pedestal portion 221d1 is provided with a plurality of insertion holes 221e penetrating in the up-down direction, and the pedestal portion 221d1 of the electric power unit 1 abuts against the product and is fixed to the product by inserting fastening members 221f such as bolts into respective insertion holes 221e and fastening the fastening members 221f to the product.

The cover member 222 includes a peripheral wall portion 222a having a substantially hollow cylindrical shape and extending in the axial direction, and an end wall portion 222b extending radially inward from a rear end portion of the peripheral wall portion 222a and covering a rear side of the rotary electric machine 21 in the axial direction. Therefore, the rear end portion of the peripheral wall portion 222a is closed by the end wall portion 222b, and an opening 222c opened forward is formed in a front end portion of the peripheral wall portion 222a. The opening 222c has a flange shape protruding radially outward from the peripheral wall portion 222a at the front end portion of the peripheral wall portion 222a.

A cylindrical diameter of the peripheral wall portion 222a of the cover member 222 is the same as a cylindrical diameter of the peripheral wall portion 221a of the case body 221, the flange-shaped opening 222c formed in the front end portion of the peripheral wall portion 222a of the cover member 222 abuts against the flange-shaped opening 221c formed in the rear end portion of the peripheral wall portion 221a of the case body 221, and the opening 221c formed in the rear end portion of the peripheral wall portion 221a of the case body 221 is closed by the cover member 222.

The rotary electric machine housing portion 220 housing the rotary electric machine 21 includes a peripheral wall portion 220a that covers an outer peripheral surface of the rotary electric machine 21, that is, an outer peripheral surface of the rotor yoke 212a in the present embodiment, a first end wall portion 220b1 that covers the front side of the rotary electric machine 21 in the axial direction, and a second end wall portion 220b2 that covers the rear side of the rotary electric machine 21 in the axial direction. The peripheral wall portion 220a of the rotary electric machine housing portion 220 is constituted by the peripheral wall portion 221a of the case body 221 and the peripheral wall portion 222a of the cover member 222, The first end wall portion 220b1 of the rotary electric machine housing portion 220 is constituted by the end wall portion 221b of the case body 221. The second end wall portion 220b2 of the rotary electric machine housing portion 220 is constituted by the end wall portion 222b of the cover member 222.

The first end wall portion 220b1 and the second end wall portion 220b2 of the rotary electric machine housing portion 220, that is, the end wall portion 221b of the case body 221 and the end wall portion 222b of the cover member 222 are each provided with a bearing 223 through which the rotary shaft 23 is inserted and which pivotally supports the rotary shaft 23.

On an outer surface of the peripheral wall portion 221a of the case body 221 constituting the peripheral wall portion 220a of the rotary electric machine housing portion 220, a plurality of heat dissipation ribs 224 protruding in the radial direction and extending in the axial direction are provided over an entire circumference along the circumferential direction. Each of the heat dissipation ribs 224 extends forward in the axial direction from the flange-shaped opening 221c formed in the rear end portion of the peripheral wall portion 221a of the case body 221, and bends radially inward at the front end portion of the peripheral wall portion 221a, so that an outer surface of the end wall portion 221b of the case body 221 protrudes to the axially outer side and extends radially inward.

On the outer surface of the peripheral wall portion 222a of the cover member 222 constituting the peripheral wall portion 220a of the rotary electric machine housing portion 220, a plurality of heat dissipation ribs 225 protruding in the radial direction and extending in the axial direction are provided over an entire circumference along the circumferential direction. Each of the heat dissipation ribs 225 extends rearward in the axial direction from the flange-shaped opening 222c formed in the front end portion of the peripheral wall portion 222a of the cover member 222, and bends radially inward at the rear end portion of the peripheral wall portion 222a, so that an outer surface of the end wall portion 222b of the cover member 222 protrudes to the axially outer side and extends radially inward.

Accordingly, by providing the plurality of heat dissipation ribs 224 and 225 on the outer surface of the rotary electric machine housing portion 220, a surface area of the outer surface of the rotary electric machine housing portion 220 increases, and the rotary electric machine housing portion 220 and the rotary electric machine 21 housed in the rotary electric machine housing portion 220 can be efficiently cooled.

(Rotary Shaft)

As shown in FIGS. 2 and 3, the rotary shaft 23 is inserted through the rotary electric machine housing portion 220, and is rotatably and pivotally supported by hearings 223 provided on the first end wall portion 220b1 and the second end wall portion 220b2 of the rotary electric machine housing portion 220.

The rotary shaft 23 has a forward protrusion 23a protruding forward from the bearing 223 provided on the first end wall portion 220b1 of the rotary electric machine housing portion 220, and a front end portion 231 of the rotary shaft 23 is located outside the rotary electric machine housing portion 220. The rotary shaft 23 has a backward protrusion 23b protruding backward from the bearing 223 provided on the second end wall portion 220b2 of the rotary electric machine housing portion 220, and a rear end portion 232 of the rotary shaft 23 is located outside the rotary electric machine housing portion 220.

The rotary shaft 23 is provided with a flange portion 233 in front of the stator 211 inside the rotary electric machine housing portion 220, the flange portion 233 extending substantially in a disk shape when viewed from the axial direction toward a radially outer side of the rotary shaft 23. The end wall portion 212b of the rotor 212 is fixed to the flange portion 233 of the rotary shaft 23 by a fastening member such as a screw. In this way, the rotor 212 is fixed to the rotary shaft 23 in front of the stator 211, and the rotary shall 23 rotates integrally with the rotor 212.

In the rotary electric machine unit 20 constitute as described above, when electric power is supplied to the coil 211b of the stator 211, the rotor 212 rotates clockwise when viewed from the front, and rotary power can be generated in the rotary shaft 23 that rotates integrally with the rotor 212. The rotary power of the rotary shaft 23 is transmitted from the rear end portion 232 of the rotary shaft 23 to any driving devices such as a cutter blade of a lawn mower or a vibration generating mechanism of a compactor.

(Internal Fan)

As shown in FIGS. 2 and 3, the internal fan 24 is attached to a front surface of the end wall portion 212b of the rotor 212. The internal fan 24 is fixed to the flange portion 233 of the rotary shaft 23 together with the end wall portion 212b of the rotor 212 by being fastened together with a fastening member such as a bolt. The internal fan 24 is provided with a plurality of blade portions 241 over the entire circumference along the circumferential direction, the plurality of blade portions 241 extending radially from a rotation axis of the rotor 212 toward the radially outer side. The internal fan 24 rotates integrally with the rotor 212. The internal fan 24 rotates integrally with the rotor 212 to generate cooling air by the blade portion 241 and diffuse the heat generated from the rotary electric machine 21 into the inside of the rotary electric machine housing portion 220. In this way, the internal fan 24 cools the rotary electric machine 21 inside the rotary electric machine housing portion 220.

<Support Member>

As shown in FIGS. 1 to 5, the support member 40 is fixed to an upper portion of the rotary electric machine housing portion 220 of the rotary electric machine case 22. The support member 40 includes a right frame 41a, a left frame 41b, a flat plate-shaped front plate 42a, a flat plate-shaped rear plate 42b, and a flat plate-shaped reinforcing plate 43. The right frame 41a extends in the front-rear direction at substantially the same position in the left-right direction as the right end portion of the peripheral wall portion 221a of the case body 221. The left frame 41b extends in the front-rear direction at a position separated leftward by a predetermined distance from a left end portion of the peripheral wall portion 221a of the case body 221. The flat plate-shaped front plate 42a connects the right frame 41a and the left frame 41b at substantially the same position in the front-rear direction as a front surface of the end wall portion 221b of the case body 221 and extends in the up-down direction and the left-right direction. The flat plate-shaped rear plate 42b connects the right frame 41a and the left frame 41b at substantially the same position in the front-rear direction as the flange-shaped opening 221c formed in the rear end portion of the peripheral wall portion 221a of the case body 221 and extends in the up-down direction and the left-right direction. The flat plate-shaped reinforcing plate 43 connects the front plate 42a and the rear plate 42b at substantially a center position of the peripheral wall portion 221a of the case body 221 in the left-right direction and extends in the up-down direction and the front-rear direction. The support member 40 further includes a left plate 44 having an upper extending portion 44a and a left extending portion 44b. The upper extending portion 44a extends in the front-rear direction and the left-right direction and has a left end portion connected to the left frame 41b, a front end portion connected to the front plate 42a, and a rear end portion connected to the rear plate 42b. The left extending portion 44b extends, from a right end portion of the upper extending portion 44a, a left side of the peripheral wall portion 221a of the case body 221 in the up-down direction and the front-rear direction.

The right frame 41a and the left frame 41b are each provided with one insertion hole 411 in the front and rear through which a fastening member for fixing the electrical unit 30 to the support member 40 is inserted. The front plate 42a and the rear plate 42b are each provided with one insertion hole 421 in the left and right through which a fastening member for fixing the support member 40 to the rotary electric machine unit 20 is inserted. A fastening portion 44c provided with an insertion hole through which a fastening member for fixing the support member 40 to the rotary electric machine unit 20 is inserted is formed at a lower end portion of the left extending portion 44b of the left plate 44.

The rear plate 42b extends in the up-down direction and the left-right direction between the front plate 42a and a rear wall portion 314 of an electrical unit case 31 of the electrical unit 30 in the front-rear direction in a state where the electrical unit 30 is fixed to the support member 40.

The support member 40 is fixed to the rotary electric machine case 22 by inserting a fastening member into the insertion hole 421 provided in the left and right of each of the front plate 42a and the rear plate 42b and an insertion hole provided in the fastening portion 44c formed in the lower end portion of the left extending portion 44b of the left plate 44 and fastening the fastening member to the rotary electric machine case 22.

<Electrical Unit>

As shown in FIGS. 1 to 3 and 5, the electrical unit 30 includes an electrical unit case 31 having a substantially rectangular parallelepiped shape. An electrical component is housed inside the electrical unit case 31. In the present embodiment, the electrical component housed inside the electrical unit case 31 is a power control device that converts electric power from a battery (not shown) and controls electric power supplied to the rotary electric machine 21 of the rotary electric machine unit 20. The electrical unit 30 is electrically connected to the battery by a power line such as a harness, and is further electrically connected to the rotary electric machine 21 of the rotary electric machine unit 20, more specifically, the coil 211b of the stator 211 by the power line such as the harness. The power control device includes electronic components such as a control circuit board that controls the power control device by external communication, a DC-DC converter that boosts electric power from the battery, an inverter that performs DC/AC conversion to generate three-phase AC power to be supplied to the rotary electric machine 21, and a current sensor that detects current of each phase of the three-phase AC power to be supplied to the rotary electric machine 21.

The electrical unit 30 is disposed above the rotary electric machine unit 20. Therefore, when viewed from the front, an arrangement direction of the electrical unit 30 with respect to the rotary electric machine housing portion 220 is an upward direction. The electrical unit 30 is disposed outside the peripheral wall portion 220a of the rotary electric machine housing portion 220 of the rotary electric machine case 22 when viewed from the front, and at a position at which at least a part of the electrical unit 30 overlaps the rotary electric machine housing portion 220 in the front-rear direction. The electrical unit 30 is fixed to the rotary electric machine unit 20 via the support member 40 by fixing the electrical unit case 31 to the support member 40.

The electrical unit case 31 of the electrical unit 30 includes a bottom wall portion 311 extending in the front-rear direction and the left-right direction, and an upper wall portion 312 above the bottom wall portion 311 that faces the bottom wall portion 311 and extends in the front-rear direction and the left-right direction. The upper wall portion 312 is inclined downward as left and right ends are directed toward left and right outer sides. The electrical unit case 31 of the electrical unit 30 further includes a front wall portion 313 that connects a front end portion of the bottom wall portion 311 and a front end portion of the upper wall portion 312 and extends in the up-down direction and the left-right direction, and a rear wall portion 314 that connects a rear end portion of the bottom wall portion 311 and a rear end portion of the upper wall portion 312 and extends in the up-down direction and the left-right direction. The electrical unit case 31 of the electrical unit 30 further includes a left wall portion 315 and a right wall portion 316. The left wall portion 315 has a lower end portion protruding downward from the bottom wall portion 311, an upper end portion connected to a left end portion of the upper wall portion 312, a front end portion connected to a left end portion of the front wall portion 313, a rear end portion connected to a left end portion of the rear wall portion 314, and a lower end portion connected to a left end portion of the bottom wall portion 311, and extends in the up-down direction and the front-rear direction. The right wall portion 316 has a lower end portion protruding downward from the bottom wall portion 311, an upper end portion connected to a right end portion of the upper wall portion 312, a front end portion connected to a right end portion of the front wall portion 313, a rear end portion connected to a right end portion of the rear wall portion 314, and a lower end portion connected to a right end portion of the bottom wall portion 311, and extends in the up-down direction and the front-rear direction. The inside of the electrical unit case 31 is a closed space surrounded by the bottom wall portion 311, the upper wall portion 312, the front wall portion 313, the rear wall portion 314, the left wall portion 315, and the right wall portion 316.

When viewed from the front, the left wall portion 315 of the electrical unit case 31 extends in the up-down direction and the front-rear direction on an outer side in the left-right direction with respect to the left end portion of the peripheral wall portion 220a of the rotary electric machine housing portion 220. Therefore, when viewed from the front, the electrical unit case 31 of the electrical unit 30 has a protrusion 32 that protrudes outward in the left-right direction from the left end portion of the peripheral wall portion 220a of the rotary electric machine housing portion 220. When viewed from the front, the right wall portion 316 of the electrical unit case 31 extends in the up-down direction and the front-rear direction at a position slightly closer to the center (substantially the same position) in the left-right direction than the right end portion of the peripheral wall portion 220a of the rotary electric machine housing portion 220.

Connecting portions 315a protruding leftward are respectively provided at a front end and a rear end of a lower end portion of the left wall portion 315 of the electrical unit case 31. The connecting portions 315a are provided at a position abutting against an upper surface of the left frame 41b of the support member 40 when viewed from the front. Connecting portions 316a protruding rightward are respectively provided at a front end and a rear end of a lower end portion of the right wall portion 316 of the electrical unit case 31. The connecting portions 316a are provided at a position abutting against an upper surface of the right frame 41a of the support member 40 when viewed from the front. A pair of front and rear connecting portions 315a and a pair of front and rear connecting portions 316a are each provided with insertion holes that penetrate in the up-down direction, and the electrical unit case 31 is fixed to the support member 40 by inserting fastening members into the insertion holes and fastening the fastening members to the left frame 41b and the right frame 41a of the support member 40, and the electrical unit 30 is fixed above the rotary electric machine unit 20 via the support member 40.

Therefore, the electrical unit 30 extends in the left-right direction from the right frame 41a to the left frame 41b in a state where the electrical unit 30 is fixed to the support member 40. Therefore, the front plate 42a and the rear plate 42b extend in the up-down direction and the left-right direction such that at least a part of the front plate 42a and the rear plate 42b overlaps the protrusion 32 of the electrical unit 30 in the left-right direction.

On a lower surface 311a of the bottom wall portion 311 of the electrical unit case 31 facing the rotary electric machine unit 20, a plurality of (16 in the present embodiment) flat plate-shaped heat dissipation fins 33 are provided side by side in the left-right direction, the flat plate-shaped heat dissipation fins 33 extending downward from the lower surface 311a of the bottom wall portion 311 and extending in the front-rear direction and the up-down direction. Lower end portions of the heat dissipation fins 33 are located at substantially the same positions as the left wall portion 315 and the right wall portion 316 of the electrical unit case 31 in the up-down direction.

A plurality of (15 in the present embodiment) inter-fin flow paths 34 extending in the front-rear direction are formed between two adjacent heat dissipation fins 33. An inter-fin flow path 34 extending in the front-rear direction is also formed between the left wall portion 315 of the electrical unit case 31 and the heat dissipation fin 33 disposed on the leftmost side, and between the right wall portion 316 of the electrical unit case 31 and the heat dissipation fin 33 disposed on the rightmost side. Therefore, in the present embodiment, a total of 17 inter-fin flow paths 34 are formed.

A shielding wall portion 35 is provided at a front end portion of the inter-fin flow path 34, the shielding wall portion 35 connecting the two adjacent heat dissipation fins 33 and extending downward from the front end portion of the bottom wall portion 311 of the electrical unit case 31. The shielding wall portion 35 is also provided at the front end portion of the inter-fin flow path 34 formed between the left wall portion 315 of the electrical unit case 31 and the heat dissipation fin 33 disposed on the leftmost side, the shielding wall portion 35 connecting the left wall portion 315 of the electrical unit case 31 and the heat dissipation fin 33 disposed on the leftmost side and extending downward from the front end portion of the bottom wall portion 311 of the electrical unit case 31. Similarly, the shielding wall portion 35 is also provided at the front end portion of the inter-fin flow path 34 formed between the right wall portion 316 of the electrical unit case 31 and the heat dissipation fin 33 disposed on the rightmost side, the shielding wall portion 35 connecting the right wall portion 316 of the electrical unit case 31 and the heat dissipation fin 33 disposed on the rightmost side and extending downward from the front end portion of the bottom wall portion 311 of the electrical unit case 31.

Rear end portions of the inter-fin flow paths 34 are all opened rearward.

The inter-fin flow path 34 formed in this way has an upper end portion closed by the bottom wall portion 311 of the electrical unit case 31 and a lower end portion opened rearward in the up-down direction. Further, the inter-fin flow path 34 has a front end portion closed by the shielding wall portion 35 and a rear end portion opened rearward in the front-rear direction.

<Cooling Unit>

As shown in FIGS. 1 to 6, the cooling unit 50 is provided on a front outer side of the rotary electric machine housing portion 220 of the rotary electric machine case 22. The cooling unit 50 includes a cooling fan 51, a fan cover 52, and an air guide unit 53.

(Cooling Fan) The cooling fan 51 is provided on the front outer side of the rotary electric machine housing portion 220 of the rotary electric machine case 22. When viewed from the front, the cooling fan 51 includes a disk-shaped disk portion 511 centered on an axis of the rotary shaft 23, a plurality of (19 in the present embodiment) blade portions 512 provided over the entire circumference along the circumferential direction of the disk portion 511, and an annular front wall portion 513 provided at front end portions of the blade portions 512.

The disk portion 511 is fixed to a forward protrusion 23a of the rotary shaft 23. In the present embodiment, the forward protrusion 23a of the rotary shaft 23 is provided with a substantially hollow cylindrical fixing member 511a that surrounds and fixes an outer peripheral surface of the forward protrusion 23a, and the disk portion 511 is fixed to the fixing member 511a. The front end portion 231 of the rotary shaft 23 has a male thread groove formed therein, and a nut 511b is screwed into the male thread groove of the front end portion 231, whereby the fixing member 511a is fixed to the forward protrusion 23a of the rotary shaft 23. In this way, the disk portion 511 is fixed to the forward protrusion 23a of the rotary shaft 23 via the fixing member 511a.

When viewed from the front, a radially inner end portion 512a of the blade portion 512 is fixed to the disk portion 511, and a radially outer end portion 512b of the blade portion 512 protrudes outward in the radial direction of the disk portion 511 and extends in the radial direction of the disk portion 511 so as to intersect the circumferential direction of the disk portion 511. The radially outer end portion 512b of the blade portion 512 is located radially inside the peripheral wall portion 220a of the rotary electric machine housing portion 220 of the rotary electric machine case 22. Therefore, the cooling fan 51 is a fan having a smaller diameter than the peripheral wall portion 220a of the rotary electric machine housing portion 220 of the rotary electric machine case 22. When viewed from the front, the blade portion 512 includes a main blade portion 512c and a blade end portion 512d. The main blade portion 512c extends substantially linearly from the radially inner end portion 512a toward a radially outer side of the disk portion 511 while being inclined at a predetermined angle in the circumferential direction toward a counterclockwise side with respect to a radial direction of the disk portion 511. The blade end portion 512d extends substantially linearly from the radially outer end portion of the main blade portion 512c toward the radially outer side of the disk portion 511 while being bent toward a clockwise side of the disk portion 511 in the circumferential direction and being inclined at a predetermined angle in the circumferential direction toward the clockwise side with respect to the radial direction of the disk portion 511. A radially outer end portion of the blade end portion 512d is a radially outer end portion 512b of the blade portion 512. In the present embodiment, the main blade portion 512c extends from the disk portion 511 to the radially outer side of the disk portion 511. The plurality of blade portions 512 provided over the entire circumference along the circumferential direction of the disk portion 511 are disposed at the same position in the radial direction of the disk portion 511, and all of the blade portions 512 have the same shape. In the present embodiment, the blade portions 512 are provided so as to protrude forward from the disk portion 511.

When viewed from the front, the front wall portion 513 extends in the radial direction from the radially inner end portions 512a to the radially outer end portions 512b of the plurality of blade portions 512, and has an annular shape centered on the axis of the rotary shaft 23.

The cooling fan 51 constituted as described above is rotated clockwise when viewed from the front together with the rotary shaft 23 by the power of the rotary electric machine 21. When the cooling fan 51 rotates clockwise when viewed from the front, cooling air is generated radially outward by the blade portions 512. At this time, since the front wall portion 513 is provided, it is possible to prevent the cooling air generated by the blade portion 512 from flowing in the front-rear direction, and it is possible to more discharge the cooling air generated by the blade portion 512 toward the radially outer side of the blade portion 512.

(Fan Cover)

The fan cover 52 includes a front cover portion 521 that covers a front side of the cooling fan 51 and a side cover portion 522 that covers the radially outer side of the cooling fan 51.

The front cover portion 521 extends in a substantially annular shape centered on the axis of the rotary shaft 23 at a position forward of the front end portion of the electrical unit 30, that is, the front wall portion 313 of the electrical unit case 31 in the front-rear direction. When viewed from the front, an annular inside of the front cover portion 521 is an intake port 523 that is opened in a substantially circular shape centered on the axis of the rotary shaft 23. In the present embodiment, the intake port 523 has a substantially circular shape having substantially the same diameter as that of the substantially disk-shaped disk portion 511.

The side cover portion 522 has a substantially hollow cylindrical shape extending rearward from a radially outer end portion of the front cover portion 521 to a vicinity of the rotary electric machine case 22. A cylindrical diameter of the side cover portion 522 is substantially the same as a cylindrical diameter of the peripheral wall portion 220a of the rotary electric machine housing portion 220 of the rotary electric machine case 22.

The fan cover 52 includes a cooling fan housing portion 520 surrounded by the front cover portion 521 and the side cover portion 522. The cooling fan 51 is housed in the cooling fan housing portion 520 of the fan cover 52. When the cooling fan 51 rotates clockwise as viewed from the front, air is taken into the cooling fan housing portion 520 through the intake port 523, and cooling air is generated radially outward by the blade portion 512.

(Air Guide Unit)

The air guide unit 53 is provided integrally with the fan cover 52.

The air guide unit 53 includes a front wall portion 53F extending upward in the up-down direction and the left-right direction from the side cover portion 522 of the fan cover 52, a left wall portion 531, extending rearward in the up-down direction and the front-rear direction from a left end portion of the front wall portion 53F, and a right wall portion 53R extending rearward in the up-down direction and the front-rear direction from a right end portion of the front wall portion 53F. The front wall portion 53F extends in the up-down direction and the left-right direction behind the front cover portion 521 of the fan cover 52. The left wall portion 53L, and the right wall portion 53R extend from the front wall portion 53F to a vicinity of the front plate 42a of the support member 40 in the front-rear direction.

The air guide unit 53 includes a cooling air flow path portion 54 surrounded by the front wall portion 53F, the left wall portion 53L, and the right wall portion 53R. A lower end portion of the cooling air flow path portion 54 is opened downward and communicates with the cooling fan housing portion 520 of the fan cover 52. An upper end portion of the cooling air flow path portion 54 is opened upward.

Therefore, the cooling air generated by the cooling fan 51 passes through the cooling air flow path portion 54 of the air guide unit 53 from the cooling fan housing portion 520, and is discharged upward from the upper end portion of the cooling air flow path portion 54.

Figure 5:
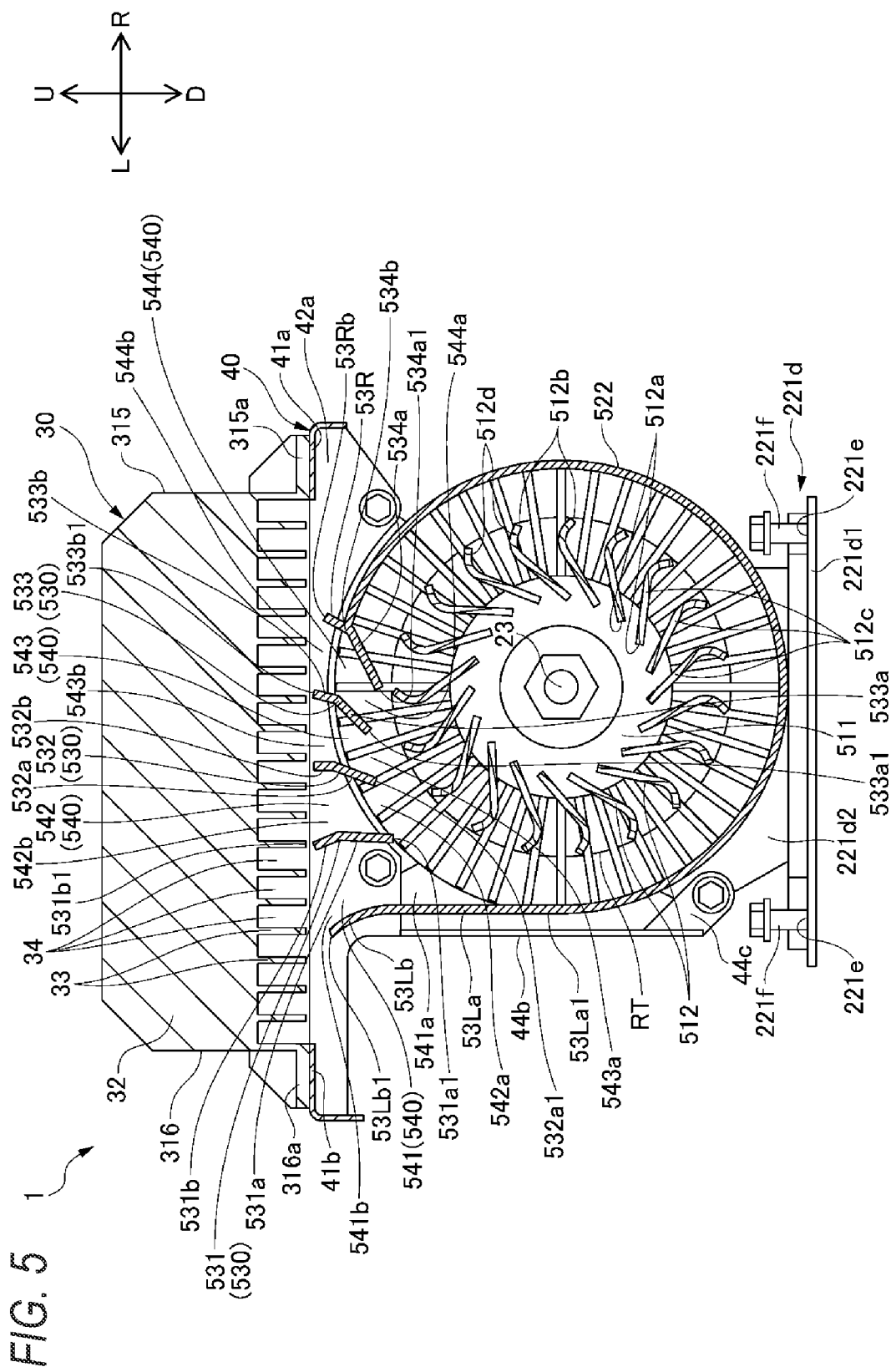
FIG. 5 is a cross-sectional view taken along a line A-A of FIG. 2.
Figure 6:
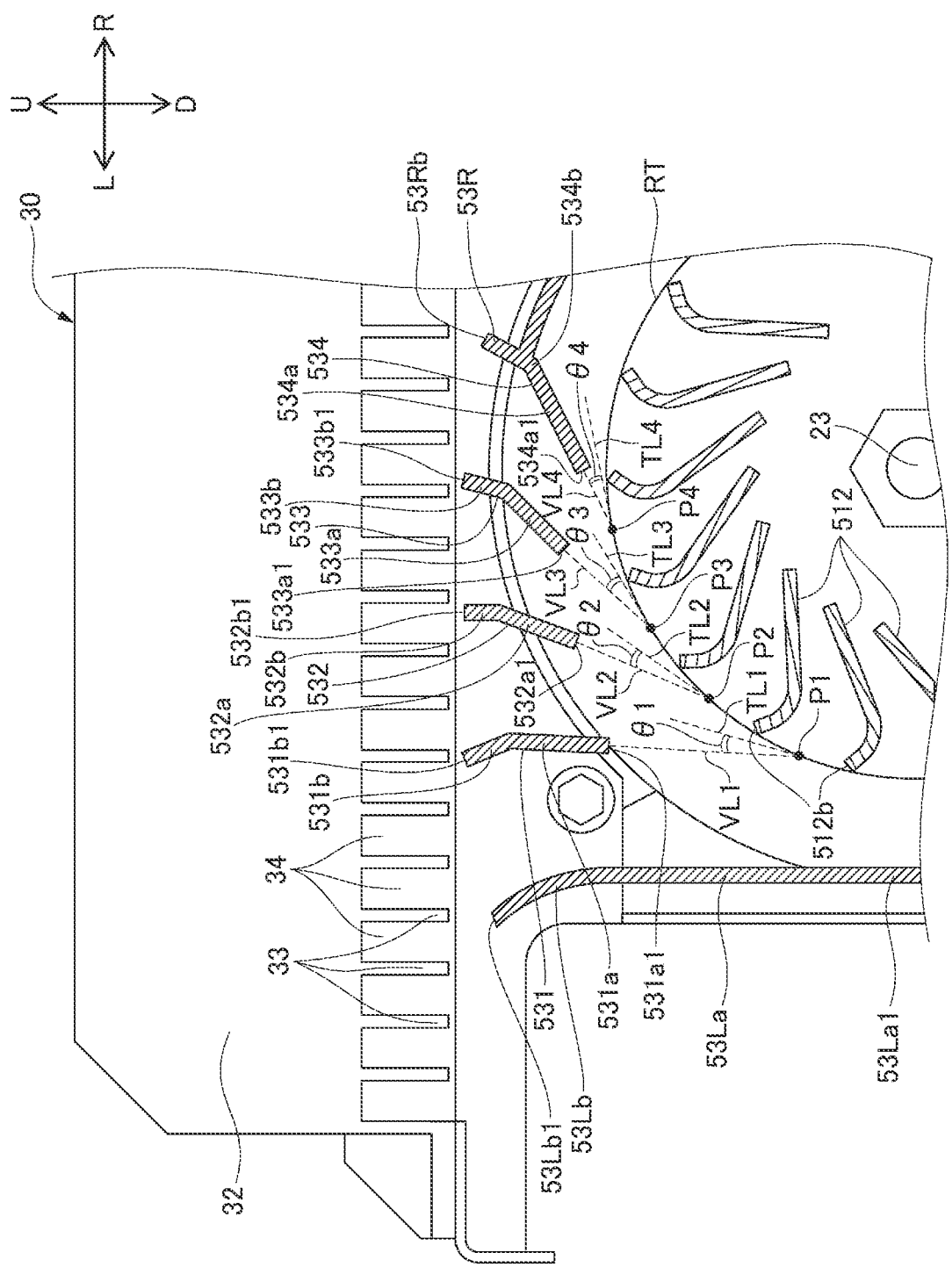
FIG. 6 is an enlarged view of a main part around an air guide unit shown in FIG. 5.

As shown in FIGS. 5 and 6, when viewed from the front, the cooling air flow path portion 54 of the air guide unit 53 includes a plurality of partition walls 530 that are disposed side by side in the circumferential direction and extend in the radial direction between the left wall portion 53L and the right wall portion 53R. In the present embodiment, the air guide unit 53 includes three partition walls 530, and the partition walls 530 include a first partition wall 531, a second partition wall 532, and a third partition wall 533, and are disposed side by side in the circumferential direction in this order in the clockwise direction when viewed from the front. When viewed from the front, the air guide unit 53 further includes a fourth partition wall 534 extending radially inward from a lower end portion of the right wall portion 53R.

The first partition wall 531, the second partition wall 532, the third partition wall 533, and the fourth partition wall 534 extend rearward from the front cover portion 521 of the fan cover 52 and the front wall portion 53F of the air guide unit 53 to substantially the same position as rear end portions of the left wall portion 53L and the right wall portion 53R in the front-rear direction. Therefore, the first partition wall 531, the second partition wall 532, the third partition wall 533, and the fourth partition wall 534 extend in the front-rear direction such that at least a part thereof overlaps with the cooling fan 51 in the front-rear direction.

When viewed from the front, the left wall portion 531: of the air guide unit 53 includes an introduction wall portion 53La linearly extending vertically upward from a left end portion of the side cover portion 522 of the fan cover 52, and a discharge wall portion 53Lb bent or curved leftward from an upper end portion of the introduction wall portion 53La and extending in an upper left direction.

When viewed from the front, the first partition wall 531 includes an introduction wall portion 531a and a discharge wall portion 531b. The introduction wall portion 531a, linearly extends on a radially outer side of a rotation trajectory RT of the radially outer end portion 512b of the blade portion 512, the radially outer end portion 512b being an outermost diameter portion of the cooling fan 51. The discharge wall portion 531b is bent or curved leftward and extends radially outward from a radially outer end portion of the introduction wall portion 531a with respect to an extending direction toward a radially outer side of the introduction wall portion 531a.

When viewed from the front, the introduction wall portion 531a is provided such that at a first intersection point P1 between a first virtual straight line VL1 extending along the linear introduction wall portion 531a and the rotation trajectory RT of the outermost diameter portion of the cooling fan 51, a first angle θ1, which is an angle formed by the first virtual straight line VL1 and a first tangent line TL1 extending from the first intersection point P1 in the clockwise direction that is a rotation direction of the rotor 212 in the circumferential direction, is a predetermined angle from the first tangent line TL1 in a counterclockwise direction opposite to the rotation direction of the rotor 212 in the circumferential direction. The first angle θ1 is acquired by using a known velocity triangle or the like based on a rotation speed of the rotor 212, a shape of the blade portion 512, and the like. The first angle θ1 is, for example, an angle of 10 degrees or more and 30 degrees or less. In the present embodiment, the introduction wall portion 531a linearly extends from the lower side to the upper side while being slightly inclined in the right direction with respect to a vertical direction.

The discharge wall portion 531b is bent or curved leftward and extends toward an upper left direction from the radially outer end portion of the introduction wall portion 531a with respect to the extending direction toward the radially outer side of the introduction wall portion 531a.

When viewed from the front, the second partition wall 532 includes an introduction wall portion 532a and a discharge wall portion 532b. The introduction wall portion 532a linearly extends on the radially outer side of the rotation trajectory RT of the radially outer end portion 512b of the blade portion 512, the radially outer end portion 512b being the outermost diameter portion of the cooling fan 51. The discharge wall portion 532b is bent or curved leftward and extends radially outward from a radially outer end portion of the introduction wall portion 532a with respect to an extending direction toward a radially outer side of the introduction wall portion 532a.

When viewed from the front, the introduction wall portion 532a is provided such that at a second intersection point P2 between a second virtual straight line VL2 extending along the linear introduction wall portion 532a and the rotation trajectory RT of the outermost diameter portion of the cooling fan 51, a second angle θ1, which is an angle formed by the second virtual straight line VL2 and a second tangent line TL2 extending from the second intersection point P2 in the clockwise direction that is the rotation direction of the rotor 212 in the circumferential direction, is a predetermined angle from the second tangent line TL2 in a counterclockwise direction opposite to the rotation direction of the rotor 212 in the circumferential direction. The second angle θ2 is acquired by using a known velocity triangle or the like based on the rotation speed of the rotor 212, the shape of the blade portion 512, and the like. The second angle θ2 is, for example, an angle of 10 degrees or more and 30 degrees or less, and is the same angle as the first angle θ1, that is, θ1=θ2. In the present embodiment, the introduction wall portion 532a linearly extends from the lower side to the upper side while being inclined to the right of the introduction wall portion 531a of the first partition wall 531 with respect to the vertical direction.

The discharge wall portion 532b is bent or curved leftward and linearly extends toward a substantially vertically upward direction from a radially outer end portion of the introduction wall portion 532a with respect to an extending direction toward a radially outer side of the introduction wall portion 532a.

When viewed from the front, the third partition wall 533 includes an introduction wall portion 533a and a discharge wall portion 533b. The introduction wall portion 533a linearly extends on the radially outer side of the rotation trajectory RT of the radially outer end portion 512b of the blade portion 512, the radially outer end portion 512b being the outermost diameter portion of the cooling fan 51. The discharge wall portion 533b is bent or curved leftward and extends radially outward from a radially outer end portion of the introduction wall portion 533a with respect to an extending direction toward a radially outer side of the introduction wall portion 533a.

When viewed from the front, the introduction wall portion 533a is provided such that at a third intersection point P3 between a third virtual straight line VL3 extending along the linear introduction wall portion 533a and the rotation trajectory RT of the outermost diameter portion of the cooling fan 51, a third angle θ1, which is an angle formed by the third virtual straight line VL3 and a third tangent line TL3 extending from the third intersection point P3 in the clockwise direction that is the rotation direction of the rotor 212 in the circumferential direction, is a predetermined angle from the third tangent line TL3 in a counterclockwise direction opposite to the rotation direction of the rotor 212 in the circumferential direction. The third angle θ3 is acquired by using a known velocity triangle or the like based on the rotation speed of the rotor 212, the shape of the blade portion 512, and the like. The third angle θ3 is, for example, an angle of 10 degrees or more and 30 degrees or less, and is the same angle as the first angle θ1 and the second angle θ2, that is, θ1=θ2=θ3. In the present embodiment, the introduction wall portion 533a linearly extends from the lower side to the upper side while being inclined to the right of the introduction wall portion 532a of the second partition wall 532 with respect to the vertical direction.

The discharge wall portion 533b is bent or curved leftward and linearly extends toward an upper right direction from a radially outer end portion of the introduction wall portion 533a with respect to an extending direction toward a radially outer side of the introduction wall portion 533a.

When viewed from the front, the third partition wall 534 includes an introduction wall portion 534a and a connection wall portion 534b. The introduction wall portion 534a linearly extends on the radially outer side of the rotation trajectory RT of the radially outer end portion 512*b* of the blade portion 512, the radially outer end portion 512*b* being the outermost diameter portion of the cooling fan 51. The connection wall portion 534*b* is bent or curved leftward from a radially outer end portion of the introduction wall portion 534*a* with respect to an extending direction toward a radially outer side of the introduction wall portion 534*a* and is connected to the lower end portion of the right wall portion 53R of the air guide unit 53.

When viewed from the front, the introduction wall portion 534*a* is provided such that at a fourth intersection point P4 between a fourth virtual straight line VL4 extending along the linear introduction wall portion 534*a* and the rotation trajectory RT of the outermost diameter portion of the cooling fan 51, a fourth angle θ4, which is an angle formed by the fourth virtual straight line VL4 and a fourth tangent line TL4 extending from the fourth intersection point P4 in the clockwise direction that is the rotation direction of the rotor 212 in the circumferential direction, is a predetermined angle from the fourth tangent line TL4 in a counterclockwise direction opposite to the rotation direction of the rotor 212 in the circumferential direction. The fourth angle θ4 is acquired by using a known velocity triangle or the like based on the rotation speed of the rotor 212, the shape of the blade portion 512, and the like. The fourth angle θ4 is, for example, an angle of 10 degrees or more and 30 degrees or less, and is the same angle as the first angle θ1, the second angle θ2, and the third angle θ3, that is, θ1=θ2=θ3=θ4. In the present embodiment, the introduction wall portion 534*a* linearly extends from the lower side to the upper side while being inclined to the right of the introduction wall portion 533*a* of the third partition wall 533 with respect to the vertical direction.

The connection wall portion 534*b* is bent or curved leftward from the radially outer end portion of the introduction wall portion 534*a* and is connected to the lower end portion of the right wall portion 53R of the air guide unit 53. The right wall portion 53R is bent or curved leftward with respect to the introduction wall portion 533*a* and linearly extends toward the upper right direction.

A plurality of cooling air flow paths 540 are formed in the cooling air flow path portion 54 of the air guide unit 53 constituted as described above. The cooling air flow paths 540 include a first cooling air flow path 541 surrounded by the front wall portion 53F, the left wall portion 53L, and the first partition wall 531, a second cooling air flow path 542 surrounded by the front wall portion 53F, the first partition wall 531, and the second partition wall 532, a third cooling air flow path 543 surrounded by the front wall portion 53F, the second partition wall 532, and the third partition wall 533, and a fourth cooling air flow path 544 surrounded by the front wall portion 53F, the third partition wall 533, the fourth partition wall 534, and the right wall portion 53R.

Therefore, the first cooling air flow path 541, the second cooling air flow path 542, the third cooling air flow path 543, and the fourth cooling air flow path 544 are disposed side by side in the circumferential direction in this order in the clockwise direction when viewed from the front. The first cooling air flow path 541 and the second cooling air flow path 542 adjacent to each other in the circumferential direction are partitioned by the first partition wall 531, the second cooling air flow path 542 and the third cooling air flow path 543 adjacent to each other in the circumferential direction are partitioned by the second partition wall 532, and the third cooling air flow path 543 and the fourth cooling air flow path 544 adjacent to each other in the circumferential direction are partitioned by the third partition wall 533.

The first cooling air flow path 541 includes a first introduction port 541*a* through which cooling air generated by the cooling fan 51 is introduced, and a first discharge port 541*b* through which the cooling air introduced through the first introduction port 541*a* is discharged. The first introduction port 541*a* is formed by a lower end portion 531*a*1 of the introduction wall portion 53La of the left wall portion 53L and a radially inner end portion 531*a*1 of the introduction wall portion 531*a* of the first partition wall 531. The first discharge port 541*b* is formed by an upper end portion 531*b*1 of the discharge wall portion 53Lb of the left wall portion 53L and a radially outer end portion 531*b*1 of the discharge wall portion 531*b* of the first partition wall 531.

An introduction direction of the cooling air at the first introduction port 541*a* of the first cooling air flow path 541 is a direction extending from the lower side to the upper side along the introduction wall portion 53La of the left wall portion 53L and the introduction wall portion 531*a* of the first partition wall 531. A discharge direction of the cooling air at the first discharge port 541*b* of the first cooling air flow path 541 is a direction extending obliquely upward to the left from the lower side along the discharge wall portion 53Lb of the left wall portion 53L, and the discharge wall portion 531*b* of the first partition wall 531. Therefore, the first cooling air flow path 541 is formed such that the discharge direction of the cooling air at the first discharge port 541*b* is directed to a left direction (that is, a direction of the protrusion 32 of the electrical unit 30) in the left-right direction with respect to the introduction direction of the cooling air at the first introduction port 541*a*.

The second cooling air flow path 542 includes a second introduction port 542*a* through which the cooling air generated by the cooling fan 51 is introduced, and a second discharge port 542*b* through which the cooling air introduced through the second introduction port 542*a* is discharged. The second introduction port 542*a* is formed by a radially inner end portion 531*a*1 of the introduction wall portion 531*a* of the first partition wall 531 and a radially inner end portion 532*a*1 of the introduction wall portion 532*a* of the second partition wall 532. The second discharge port 542*b* is formed by a radially outer end portion 531*b*1 of the discharge wall portion 531*b* of the first partition wall 531 and a radially outer end portion 532*b*1 of the discharge wall portion 532*b* of the second partition wall 532.

An introduction direction of the cooling air at the second introduction port 542*a* of the second cooling air flow path 542 is a direction extending obliquely upward to the right from the lower side along the introduction wall portion 531*a* of the first partition wall 531 and the introduction wall portion 532*a* of the second partition wall 532. A discharge direction of the cooling air at the second discharge port 542*b* of the second cooling air flow path 542 is a direction extending from the lower side to the upper side along the discharge wall portion 531*b* of the first partition wall 531 and the discharge wall portion 532*b* of the second partition wall 532. Therefore, the second cooling air flow path 542 is formed such that the discharge direction of the cooling air at the second discharge port 542*b* is directed to the left direction (that is, the direction of the protrusion 32 of the electrical unit 30) in the left-right direction with respect to the introduction direction of the cooling air at the second introduction port 542*a*.

The third cooling air flow path 543 includes a third introduction port 543*a* through which the cooling air generated by the cooling fan 5 is introduced, and a third discharge port 543b through which the cooling air introduced through the third introduction port 543a is discharged. The third introduction port 543a is formed by a radially inner end portion 532a1 of the introduction wall portion 532a of the second partition wall 532 and a radially inner end portion 533a1 of the introduction wall portion 533a of the third partition wall 533. The third discharge port 543b is formed by a radially outer end portion 532b1 of the discharge wall portion 532b of the second partition wall 532 and a radially outer end portion 533b1 of the discharge wall portion 533b of the third partition wall 533.

An introduction direction of the cooling air at the third introduction port 543a of the third cooling air flow path 543 is a direction extending obliquely upward to the right from the lower side along the introduction wall portion 532a of the second partition wall 532 and the introduction wall portion 533a of the third partition wall 533. A discharge direction of the cooling air at the third discharge port 543b of the third cooling air flow path 543 is a direction extending from the lower side to the upper side along the discharge wall portion 532b of the second partition wall 532 and the discharge wall portion 533b of the third partition wall 533. Therefore, the third cooling air flow path 543 is formed such that the discharge direction of the cooling air at the third discharge port 543b is directed to the left direction (that is, the direction of the protrusion 32 of the electrical unit 30) in the left-right direction with respect to the introduction direction of the cooling air at the third introduction port 543a.

The fourth cooling air flow path 544 includes a fourth introduction port 544a through which the cooling air generated by the cooling fan 51 is introduced, and a fourth discharge port 544b through which the cooling air introduced through the fourth introduction port 544a is discharged. The fourth introduction port 544a is formed by a radially inner end portion 533a1 of the introduction wall portion 533a of the third partition wall 533 and a radially inner end portion 534a1 of the introduction wall portion 534a of the fourth partition wall 534. The fourth discharge port 544b is formed by a radially outer end portion 533b1 of the discharge wall portion 533b of the third partition wall 533 and an upper end portion 53Rb of the right wall portion 53R.

An introduction direction of the cooling air at the fourth introduction port 544a of the fourth cooling air flow path 544 is a direction extending obliquely upward to the right from the lower side along the introduction wall portion 533a of the third partition wall 533 and the introduction wall portion 534a of the fourth partition wall 534. A discharge direction of the cooling air at the fourth discharge port 544b of the fourth cooling air flow path 544 is a direction extending from the lower side to the upper side along the discharge wall portion 533b of the third partition wall 533 and the right wall portion 53R. Therefore, the fourth cooling air flow path 544 is formed such that the discharge direction of the cooling air at the fourth discharge port 544b is directed to the left direction (that is, the direction of the protrusion 32 of the electrical unit 30) in the left-right direction with respect to the introduction direction of the cooling air at the fourth introduction port 544a.

In the plurality of cooling air flow paths 540 formed in the cooling air flow path portion 54 of the air guide unit 53, the cooling air flow path 540 disposed at a position closer to the protrusion 32 of the electrical unit 30 has a larger opening area of the introduction port. That is, an opening area of the first introduction port 541a of the first cooling air flow path 541 is larger than an opening area of the second introduction port 542a of the second cooling air flow path 542, the opening area of the second introduction port 542a of the second cooling air flow path 542 is larger than an opening area of the third introduction port 543a of the third cooling air flow path 543, and the opening area of the third introduction port 543a of the third cooling air flow path 543 is larger than an opening area of the fourth introduction port 544a of the fourth cooling air flow path 544. In other words, (the opening area of the first introduction port 541a of the first cooling air flow path 541)>(the opening area of the second introduction port 542a of the second cooling air flow path 542)>(the opening area of the third introduction port 543a of the third cooling air flow path 543)>(the opening area of the fourth introduction port 544a of the fourth cooling air flow path 544).

The plurality of cooling air flow paths 540 formed in the cooling air flow path portion 54 of the air guide unit 53 are disposed such that the respective discharge ports overlap the front plate 42a of the support member 40 when viewed from the front. Specifically, the first discharge port 541b of the first cooling air flow path 541, the second, discharge port 542b of the second cooling air flow path 542, the third discharge port 543b of the third cooling air flow path 543, and the fourth discharge port 544b of the fourth cooling air flow path 544 are disposed so as to overlap the front plate 42a of the support member 40. In other words, when viewed from the front, the front plate 42a of the support member 40 extends in the front-rear direction and the left-right direction at positions overlapping the first discharge port 541b of the first cooling air flow path 541, the second discharge port 542b of the second cooling air flow path 542, the third discharge port 543b of the third cooling air flow path 543, and the fourth discharge port 544b of the fourth cooling air flow path 544.

(Flow of Cooling Air)

Next, flow of the cooling air generated by the cooling fan 51 in the electric power unit 1 will be described with reference to FIGS. 2 and 5.

When the cooling fan 51 rotates clockwise as viewed from the front integrally with the rotary shaft 23, the air is taken into the cooling fan housing portion 520 from the intake port 523 of the fan cover 52, and cooling air flowing clockwise in the circumferential direction and radially outward as viewed from the front is generated in the cooling fan housing portion 520 by the blade portion 512.

The cooling air generated by the cooling fan 51 and flowing clockwise in the circumferential direction and radially outward as viewed from the front is introduced into the first introduction port 541a of the first cooling air flow path 541, the second introduction port 542a of the second cooling air flow path 542, the third introduction port 543a of the third cooling air flow path 543, and the fourth introduction port 544a of the fourth cooling air flow path 544 of the air guide unit 53, passes through the first cooling air flow path 541, the second cooling air flow path 542, the third cooling air flow path 543, and the fourth cooling air flow path 544, and is discharged from the first discharge port 541b of the first cooling air flow path 541, the second discharge port 542b of the second cooling air flow path 542, the third discharge port 543b of the third cooling air flow path 543, and the fourth discharge port 544b of the fourth cooling air flow path 544. In this way, the cooling air generated by the cooling fan 51 is discharged from the air guide unit 53.

At this time, since the cooling air generated by the cooling fan 51 flows clockwise in the circumferential direction when viewed from the front, the cooling air flows in the right direction above the rotary shaft 23. Therefore, the cooling air tends to be difficult to be supplied to the left side (that is, the direction of the protrusion 32 of the electrical unit 30) of the electrical unit 30 disposed above the cooling fan 51. Further, when the electrical unit 30 has the protrusion 32 protruding outward in the left-right direction from the left end portion of the peripheral wall portion 220*a* of the rotary electric machine housing portion 220, the protrusion 32 of the electrical unit 30 is less likely to be supplied with the cooling air and is less likely to be cooled.

However, in the present embodiment, the opening area of the first introduction port 541*a* of the first cooling air flow path 541 is larger than the opening area of the second introduction port 542*a* of the second cooling air flow path 542, the opening area of the second introduction port 542*a* of the second cooling air flow path 542 is larger than the opening area of the third introduction port 543*a* of the third cooling air flow path 543, and the opening area of the third introduction port 543*a* of the third cooling air flow path 543 is larger than the opening area of the fourth introduction port 544*a* of the fourth cooling air flow path 544, and thus, the cooling air flow path 540 disposed at a position closer to the protrusion 32 of the electrical unit 30 has a larger opening area of the introduction port. Accordingly, a larger amount of cooling air flows through the cooling air flow path 540 disposed at a position closer to the protrusion 32 of the electrical unit 30, a larger amount of cooling air can be supplied to the protrusion 32 of the electrical unit 30, and the protrusion 32 of the electrical unit 30 can be effectively cooled.

The first cooling air flow path 541 is formed such that the discharge direction of the cooling air at the first discharge port 541*b* is directed to the left direction (that is, the direction of the protrusion 32 of the electrical unit 30) in the left-right direction with respect to the introduction direction of the cooling air at the first introduction port 541*a*, the second cooling air flow path 542 is formed such that the discharge direction of the cooling air at the second discharge port 542*b* is directed to the left direction (that is, the direction of the protrusion 32 of the electrical unit 30) in the left-right direction with respect to the introduction direction of the cooling air at the second introduction port 542*a*, the third cooling air flow path 543 is formed such that the discharge direction of the cooling air at the third discharge port 543*b* is directed to the left direction (that is, the direction of the protrusion 32 of the electrical unit 30) in the left-right direction with respect to the introduction direction of the cooling air at the third introduction port 543*a*, and the fourth cooling air flow path 544 is formed such that the discharge direction of the cooling air at the fourth discharge port 544*b* is directed to the left direction (that is, the direction of the protrusion 32 of the electrical unit 30) in the left-right direction with respect to the introduction direction of the cooling air at the fourth introduction port 544*a*. Thus, when viewed from the front, each cooling air flow path 540 is formed such that the discharge direction of the cooling air at the discharge port is directed to the left direction in the left-right direction, that is, a direction approaching the protrusion 32 of the electrical unit 30 with respect to the introduction direction of the cooling air at the introduction port. Accordingly, since the cooling air is discharged from the discharge port of each cooling air flow path 540 in the direction approaching the protrusion 32 of the electrical unit 30, a larger amount of cooling air can be supplied to the protrusion 32 of the electrical unit 30, and the protrusion 32 of the electrical unit 30 can be cooled more effectively.

Since the first cooling air flow path 541, the second cooling air flow path 542, the third cooling air flow path 543, and the fourth cooling air flow path 544 are disposed side by side in the circumferential direction in this order in the clockwise direction when viewed from the front, the plurality of cooling air flow paths 540 can be disposed along the rotation direction of the cooling fan 51, and a larger amount of cooling air can be introduced into the air guide unit 53.

As described above, when viewed from the front, the introduction wall portion 531*a* of the first partition wall 531 is provided such that at the first intersection point P1 between the first virtual straight line VL1 extending along the linear introduction wall portion 531*a* and the rotation trajectory RT of the outermost diameter portion of the cooling fan 51, the first angle θ1, which is the angle formed by the first virtual straight line VL1 and the first tangent line TL1 extending from the first intersection point P1 in the clockwise direction that is the rotation direction of the rotor 212 in the circumferential direction, is the predetermined angle from the first tangent line 1 in the counterclockwise direction opposite to the rotation direction of the rotor 212 in the circumferential direction. Similarly, when viewed from the front, the introduction wall portion 532*a* of the second partition wall 532 is provided such that at the second intersection point P2 between the second virtual straight line VL2 extending along the linear introduction wall portion 532*a* and the rotation trajectory RT of the outermost diameter portion of the cooling fan 51, the second angle θ2, which is the angle formed by the second virtual straight line VL2 and the second tangent line TL2 extending from the second intersection point P2 in the clockwise direction that is the rotation direction of the rotor 212 in the circumferential direction, is the predetermined angle from the second tangent line TL2 in the counterclockwise direction opposite to the rotation direction of the rotor 212 in the circumferential direction. When viewed from the front, the introduction wall portion 533*a* of the third partition wall 533 is provided such that at the third intersection point P3 between the third virtual straight line VL3 extending along the linear introduction wall portion 533*a* and the rotation trajectory RT of the outermost diameter portion of the cooling fan 51, the third angle θ3, which is the angle formed by the third virtual straight line VL3 and the third tangent line TL3 extending from the third intersection point P3 in the clockwise direction that is the rotation direction of the rotor 212 in the circumferential direction, is the predetermined angle from the third tangent line TL3 in the counterclockwise direction opposite to the rotation direction of the rotor 212 in the circumferential direction. When viewed from the front, the introduction wall portion 534*a* of the fourth partition wall 534 is provided such that at the fourth intersection point P4 between the fourth virtual straight line VL4 extending along the linear introduction wall portion 534*a* and the rotation trajectory RT of the outermost diameter portion of the cooling fan 51, the fourth angle θ4, which is the angle formed by the fourth virtual straight line VL4 and the fourth tangent line TL4 extending from the fourth intersection point P4 in the clockwise direction that is the rotation direction of the rotor 212 in the circumferential direction, is the predetermined angle from the fourth tangent line TL4 in the counterclockwise direction opposite to the rotation direction of the rotor 212 in the circumferential direction.

Therefore, the first angle θ1, the second angle θ2, the third angle θ3, and the fourth angle θ4 can be set to angles along a flow direction of the cooling air by using a known velocity triangle or the like, and the introduction wall portion 531*a* of the first partition wall 531, the introduction wall portion 532a of the second partition wall 532, the introduction wall portion 533a of the third partition wall 533, and the introduction wall portion 534a of the fourth partition wall 534 can be provided so as to linearly extend at the angles along the flow direction of the cooling air. Accordingly, since the cooling air can be introduced with low resistance from the first introduction port 541a of the first cooling air flow path 541, the second introduction port 542a of the second cooling air flow path 542, the third introduction port 543a of the third cooling air flow path 543, and the fourth introduction port 544a of the fourth cooling air flow path, a larger amount of cooling air can be discharged from the air guide unit 53.

Further, since the first angle θ1, the second angle θ2, the third angle θ3, and the fourth angle θ4 are the same angle, all of the introduction wall portion 531a of the first partition wall 531, the introduction wall portion 532a of the second partition wall 532, the introduction wall portion 533a of the third partition wall 533, and the introduction wall portion 534a of the fourth partition wall 534 can be provided so as to extend linearly at the angles along the flow direction of the cooling air. Accordingly, since the cooling air can be introduced with low resistance from any of the first introduction port 541a of the first cooling air flow path 541, the second introduction port 542a of the second cooling air flow path 542, the third introduction port 543a of the third cooling air flow path 543, and the fourth introduction port 544a of the fourth cooling air flow path, a larger amount of cooling air can be discharged from the air guide unit 53.

As shown in FIG. 2, a part of the cooling air discharged from the air guide unit 53 flows upward and is introduced into the inter-fin flow path 34 of the electrical unit 30. The cooling air introduced into the inter-fin flow path 34 of the electrical unit 30 flows rearward through the inter-fin flow path 34 while cooling the electrical unit 30.

At this time, the shielding wall portion 35 is provided at the front end portion of the inter-fin flow path 34, the shielding wall portion 35 connecting the two adjacent heat dissipation fins 33 and extending downward from the front end portion of the bottom wall portion 311 of the electrical unit case 31, and thus, the cooling air introduced into the inter-fin flow path 34 of the electrical unit 30 can be prevented from flowing forward by the shielding wall portion 35. Accordingly, since the cooling air introduced into the inter-fin flow path 34 of the electrical unit 30 can reliably flow rearward, the electrical unit 30 can be cooled more effectively.

A part of the cooling air discharged from the air guide unit 53 flows rearward.

At this time, when viewed from the front, the front plate 42a of the support member 40 extends in the front-rear direction and the left-right direction at the positions overlapping the first discharge port 541b of the first cooling air flow path 541, the second discharge port 542b of the second cooling air flow path 542, the third discharge port 543b of the third cooling air flow path 543, and the fourth discharge port 544b of the fourth cooling air flow path 544. Thus, the cooling air discharged from the air guide unit 53 and flowing rearward hits the front plate 42a of the support member 40, a part of the cooling air flows upward and is introduced into the inter-fin flow path 34 of the electrical unit 30, a part of the cooling air flows downward and flows toward the peripheral wall portion 220a of the rotary electric machine housing portion 220 of the rotary electric machine case 22, and a part of the cooling air flows leftward (that is, in the direction of the protrusion 32 of the electrical unit 30).

Therefore, since a part of the cooling air discharged from the air guide unit 53 and flowing rearward can be guided toward the inter-fin flow path 34 of the electrical unit 30 by the front plate 42a extending in the front-rear direction and the left-right direction, the electrical unit 30 can be cooled more effectively. In addition, since a part of the cooling air discharged from the air guide unit 53 and flowing rearward can be guided in the direction approaching the rotary electric machine housing portion 220 of the rotary electric machine case 22 by the front plate 42a extending in the front-rear direction and the left-right direction, the amount of cooling air hitting the rotary electric machine housing portion 220 of the rotary electric machine case 22 can be increased, and the rotary electric machine unit 20 can be effectively cooled.

Since at least a part of the front plate 42a of the support member 40 extends so as to overlap the protrusion 32 of the electrical unit 30 in the left-right direction, the cooling air discharged from the air guide unit 53 and flowing rearward hits the front plate 42a of the support member 40, and the cooling air flowing leftward can be guided to the protrusion 32 of the electrical unit 30. A larger amount of cooling air can be supplied to the protrusion 32 of the electrical unit 30, and the protrusion 32 of the electrical unit 30 can be cooled more effectively.

Thus, the front plate 42a of the support member 40 functions as a first air guide member that guides the cooling air discharged from the air guide unit 53.

The cooling air hitting the rotary electric machine housing portion 220 of the rotary electric machine case 22 flows rearward along the heat dissipation ribs 224 in the vicinity of the peripheral wall portion 220a of the rotary electric machine housing portion 220 while cooling the rotary electric machine unit 20.

At this time, the flat plate-shaped rear plate 42b extending in the up-down direction and the left-right direction is provided between the front plate 42a and the rear wall portion 314 of the electrical unit case 31 of the electrical unit 30 in the front-rear direction and at substantially the same position as the opening 221c formed in the rear end portion of the peripheral wall portion 221a, of the case body 221 in the front-rear direction. Therefore, the cooling air flowing rearward along the heat dissipation ribs 224 in the vicinity of the peripheral wall portion 220a of the rotary electric machine housing portion 220 hits the rear plate 42b of the support member 40, a part of the cooling air flows upward and is introduced into the inter-fin flow path 34 of the electrical unit 30, and a part of the cooling air flows downward and flows toward the peripheral wall portion 222a of the cover member 222 of the rotary electric machine case 22. The cooling air flowing through the peripheral wall portion 222a of the cover member 222 of the rotary electric machine case 22 is discharged rearward as it is.

Therefore, since a part of the cooling air flowing rearward along the heat dissipation ribs 224 in the vicinity of the peripheral wall portion 220a of the rotary electric machine housing portion 220 can be introduced into the inter-fin flow paths 34 of the electrical unit 30 by the rear plate 42b extending in the front-rear direction and the left-right direction, the electrical unit 30 can be cooled more effectively.

Thus, the rear plate 42b of the support member 40 functions as a second air guide member that guides the cooling air passing through the front plate 42a that functions as the first air guide member.

The cooling air flowing through the inter-fin flow path 34 is discharged from the open rear end portion of the inter-fin flow path 34.

Although one embodiment of the present invention has been described above with reference to the accompanying drawings, it is needless to say that the present invention is not limited to such an embodiment. It is apparent to those skilled in the art that various changes and modifications can be conceived within the scope of the claims, and it is also understood that such variations and modifications belong to the technical scope of the present invention. In addition, the constituent elements in the above embodiment may be freely combined without departing from the spirit of the invention.

For example, the air guide unit 53 is provided in the fan cover 52 in the present embodiment, but the air guide unit 53 may be provided separately from the fan cover 52.

For example, in the present embodiment, the rotary electric machine 21 is the outer rotor type rotary electric machine in which the rotor 212 is disposed outside the stator 211 in the radial direction of the rotary electric machine 21, but the rotary electric machine may be an inner rotor-side rotary electric machine in which the stator 211 is disposed so as to surround the outer peripheral surface of the rotor 212.

For example, in the present embodiment, the front plate 42a of the support member 40 functions as the first air guide member that guides the cooling air discharged from the air guide unit 53, and the rear plate 42b of the support member 40 functions as the second air guide member that guides the cooling air passing through the front plate 42a that functions as the first air guide member, but the first air guide member and the second air guide member may be separate members from the support member 40.

For example, in the present embodiment, the electrical component housed inside the electrical unit case 31 is a power control device that converts electric power from a battery (not shown) and controls electric power supplied to the rotary electric machine 21 of the rotary electric machine unit 20, but the electrical component housed inside the electrical unit case 31 is not limited to the power control device, and may be any electrical component, for example, a battery or the like.

In the present description, at least the following matters are described, in the parentheses, the corresponding constituent elements and the like in the above embodiment are shown as an example, and the present invention is not limited thereto.

(1) An electric power unit (electric power unit 1) including:
  a rotary electric machine unit (rotary electric machine unit 20);
  an electrical unit (electrical unit 30) disposed outside the rotary electric machine unit; and
  a cooling unit (cooling unit 50), in which
  the rotary electric machine unit further includes:
    a rotary electric machine (rotary electric machine 21) having a stator (stator 2) and a rotor (rotor 212);
    a rotary electric machine case (rotary electric machine case 22) having a rotary electric machine housing portion (rotary electric machine housing portion 220) accommodating the rotary electric machine; and
    a rotary shaft (rotary shaft 23) configured to rotate integrally with the rotor, in which
  the rotary electric machine housing portion includes:
    a peripheral wall portion (peripheral wall portion 220a) configured to cover an outer peripheral surface of the rotary electric machine;
    a first end wall portion (first end wall portion 220b1) covering one axial end side (front side) of the rotary electric machine in an axial direction; and
    a second end wall portion (second end wall portion 220b2) covering another axial end side (rear side) in the axial direction, and
  the rotary shaft is inserted through the rotary electric machine housing portion and protrudes from the first end wall portion to the one axial end side,
  the electrical unit is disposed outside the peripheral wall portion of the rotary electric machine housing portion when viewed from the axial direction and disposed at a position at which at least a part of the electrical unit overlaps the rotary electric machine housing portion in the axial direction,
  the electrical unit includes a protrusion (protrusion 32), the protrusion, when viewed from the axial direction, protruding outward from one end portion (left end portion) of the rotary electric machine housing portion in a second direction (left-right direction) orthogonal to a first direction (up-down direction), the first direction being a direction in which the electrical unit is disposed with respect to the rotary electric machine housing portion, and
  the cooling unit includes:
    a cooling fan (cooling fan 51) configured to generate cooling air; and
    an air guide unit (air guide unit 53) configured to guide the cooling air, in which
    the cooling fan is provided on an axially outer side of the one axial end side of the rotary electric machine housing portion and configured to rotate integrally with the rotary shaft, and
    the air guide unit includes cooling air flow paths (the cooling air flow path 540, the first cooling air flow path 541, the second cooling air flow path 542, the third cooling air flow path 543, and the fourth cooling air flow path 544) provided between the cooling fan and the electrical unit when viewed from the axial direction, in which
    when viewed from the axial direction, the air flow paths include introduction ports (the first introduction port 541a, the second introduction port 542a, the third introduction port 543a, and the fourth introduction port 544a) opened toward the cooling fan, and discharge ports (the first discharge port 541b, the second discharge port 542b, the third discharge port 543b, and the fourth discharge port 544b) opened toward the electrical unit, and
    the closer to the protrusion of the electrical unit a cooling air flow path is disposed, the larger opening area of the introduction port the cooling air flow path has.

According to (1), since the cooling air flow path disposed closer to the protrusion of the electrical unit has a larger opening area of the introduction port, a large amount of cooling air flows through the cooling air flow path disposed closer to the protrusion of the electrical unit, a large amount of cooling air can be supplied to the protrusion of the electrical unit, and the protrusion of the electrical unit can be effectively cooled.

(2) The electric power unit according to (1), in which
  each of the cooling air flow paths is formed such that, when viewed from the axial direction, a discharge direction of the cooling air at the discharge port is oriented in a direction more approaching to the protrusion in the second direction than an introduction direction of the cooling air at the introduction port.

According to (2), since the cooling air flow path is formed such that, when viewed from the axial direction, the discharge direction of the cooling air at the discharge port is oriented in the direction more approaching to the protrusion in the second direction than the introduction direction of the cooling air at the introduction port, the cooling air is discharged from the discharge port of the cooling air flow path in a direction approaching the protrusion of the electrical unit. Accordingly, a larger amount of cooling air can be supplied to the protrusion of the electrical unit, and the protrusion of the electrical unit can be cooled more effectively.

(3) The electric power unit according to (1) or (2), in which
the cooling air flow paths are disposed side by side between the cooling fan and the electrical unit in a circumferential direction of the rotary electric machine and the cooling fan when viewed from the axial direction.

According to (3), since the cooling air flow paths are disposed side by side in the circumferential direction of the rotary electric machine and the cooling fan when viewed from the axial direction, the plurality of cooling air flow paths can be disposed along the rotation direction of the cooling fan, and a larger amount of cooling air can be introduced into the air guide unit.

4) The electric power unit according to (3), in which
the air guide unit includes at least one partition wall (the partition wall 530, the first partition wall 531, the second partition wall 532, and the third partition wall 533) extending in the axial direction such that at least a part of the partition walls overlaps the cooling fan in the axial direction and partitioning two adjacent cooling air flow paths in the circumferential direction,
when viewed from the axial direction, the at least one partition wall include:
an introduction wall portion (introduction wall portions 531a, 532a, and 533a) having radially inner end portions (radially inner end portion 531a1, 532a1, and 533a1) forming the introduction ports of the cooling air flow paths and extend linearly: and
a discharge wall portion (discharge wall portions 531b, 532b, and 533b) extending in a bending or curving form from a radially outer end portion of the introduction wall portion in a direction approaching the protrusion with respect to the introduction wall portion, in which radially outer end portions (radially outer end portions 531b1, 532b1, and 533b1) of the discharge wall portions form the discharge ports of the cooling air flow paths, and
when viewed from the axial direction, the introduction wall portion is provided such that, at intersection point (the first intersection point P1, the second intersection point P2, and the third intersection point P3) of virtual straight line (the first virtual straight line VL1, the second virtual straight line VL2, and the third virtual straight line VL3) extending along the introduction wall portion and a rotation trajectory (rotation trajectory RT) of an outermost diameter portion (radially outer end portion 512b) of the cooling fan, an angle (the first angle θ1, the second angle θ2, and the third angle θ3) formed by the virtual straight line and tangent line (the first tangent line TL1, the second tangent line TL2, and the third tangent line TL3) of the rotation trajectory extending from the intersection point toward a rotation direction (clockwise direction) of the rotor in the circumferential direction is predetermined angle from the tangent line in a direction (counterclockwise direction) opposite to the rotation direction of the rotor in the circumferential direction.

According to (4), at the intersection point of the virtual straight line extending along the introduction wall portion and the rotation trajectory of the outermost diameter portion of the cooling fan, the angle formed by the virtual straight line and the tangent line of the rotation trajectory extending from the intersection point toward the rotation direction of the rotor in the circumferential direction can be set to the angles along the flow direction of the cooling air, and the introduction wall portion can be provided so as to linearly extend at the angle along the flow direction of the cooling air. Accordingly, since the cooling air can be introduced with low resistance from the introduction port of the cooling air flow paths, a larger amount of cooling air can be discharged from the air guide unit.

(5) The electric power unit according to (4), in which
the at least one partition wall includes a plurality of partition walls disposed side by side in the circumferential direction,
the air guide unit includes three or more of the cooling air flow paths disposed side by side in the circumferential direction between the cooling fan and the electrical unit when viewed from the axial direction, and
the introduction wall portions of the plurality of partition walls are provided such that angles formed by the introduction wall portions are the same predetermined angle.

According to (5), since the introduction wall portions of the plurality of partition walls are provided such that the angles formed by the introduction wall portions are the same predetermined angle, the cooling air can be introduced with low resistance from any of the introduction ports of the cooling air flow paths. Therefore, a larger amount of cooling air can be discharged from the air guide unit.

(6) The electric power unit according to any one of (1) to (5), further including:
a first air guide member (front plate 42a) configured to guide the cooling air discharged from the air guide unit, in which
the first air guide member extends, when viewed from the axial direction, between the rotary electric machine housing portion and the electrical unit such that at least a part of the first air guide member overlaps the protrusion in the second direction at a position overlapping the discharge port of the cooling air flow path.

According to (6), since the first air guide member extends, when viewed from the axial direction, between the rotary electric machine housing portion and the electrical unit so that at least a part of the first air guide member overlaps the protrusion in the second direction at the position overlapping the discharge port of the cooling air flow path, the cooling air that hits the first air guide member and flows toward the direction approaching the protrusion in the second direction can be guided to the protrusion of the electrical unit. Accordingly, a larger amount of cooling air can be supplied to the protrusion of the electrical unit, and the protrusion of the electrical unit can be cooled more effectively.

(7) The electric power unit according to (6), in which
a plurality of heat dissipation ribs (heat dissipation ribs 224 and 225) are provided on an outer surface of the peripheral wall portion of the rotary electric machine housing portion, the heat dissipation ribs protruding outward in a radial direction of the rotary electric machine and extending in the axial direction,
a plurality of heat dissipation fins (heat dissipation fin 33) extending in the axial direction and the first direction are provided on a facing surface (lower surface 311a) of the electrical unit facing the rotary electric machine unit, and the first air guide member extends in the first direction and the second direction.

According to (7), since the first air guide member extending in the first direction and the second direction can guide a part of the cooling air, which is discharged from the air guide unit and flows to the other axial end side, in a direction approaching the electrical unit, the electrical unit can be cooled more effectively. In addition, since the first air guide member extending in the first direction and the second direction can guide a part of the cooling air, which is discharged from the air guide unit and flows to the other axial end side, in a direction approaching the rotary electric machine housing portion of the rotary electric machine case, the amount of cooling air hitting the rotary electric machine housing portion of the rotary electric machine case can be increased, and the rotary electric machine unit can be effectively cooled.

(8) The electric power unit according to (7), in which
an inter-fin flow path (inter-fin flow path 34) extending in the axial direction is formed between two adjacent heat dissipation fins,
a shielding wall portion (shielding wall portion 35) is provided at an end portion (front end portion) of the one axial end side of the inter-fin flow path, the shielding wall portion connecting the two adjacent heat dissipation fins and extending in the first direction, and
an end portion (rear end portion) of the another axial end side of the inter-fin flow path is opened toward the another axial end side.

According to (8), the shielding wall portion is provided at the end portion of the one axial end side of the inter-fin flow path, the shielding wall portion connecting the two adjacent heat dissipation fins and extending in the first direction, and the end portion of the another axial end side of the inter-fin flow path is opened toward the another axial end side. Thus, the cooling air introduced into the inter-fin flow path can reliably flow toward the other axial end side, and the electrical unit can be more effectively cooled.

(9) The electric power unit according to any one of (6) to (8), further including:
a second air guide member (rear plate 42b) configured to guide the cooling air that has passed through the first air guide member, in which
the second air guide member is disposed between the first air guide member and an end portion (rear end portion) of the another axial end side of the electrical unit, and extends in the first direction.

According to (9), since the electric power unit further includes the second air guide member that is disposed between the first air guide member and the end portion of the another axial end side of the electrical unit and extends in the first direction, a part of the cooling air, which is guided by the first air guide member in the direction approaching the rotary electric machine housing portion of the rotary electric machine case and flows to the other axial end side along the heat dissipation ribs in the vicinity of the peripheral wall portion of the rotary electric machine housing portion, can be guided in the direction approaching the electrical unit by the second air guide member extending in the first direction, and the electrical unit can be more effectively cooled.

What is claimed is:

1. An electric power unit comprising:
a rotary electric machine unit;
an electrical unit disposed outside the rotary electric machine unit; and
a cooling unit, wherein
the rotary electric machine unit further includes:
a rotary electric machine having a stator and a rotor;
a rotary electric machine case having a rotary electric machine housing portion accommodating the rotary electric machine; and
a rotary shaft configured to rotate integrally with the rotor, wherein
the rotary electric machine housing portion includes:
a peripheral wall portion covering an outer peripheral surface of the rotary electric machine;
a first end wall portion covering one axial end side of the rotary electric machine in an axial direction; and
a second end wall portion covering another axial end side in the axial direction, and
the rotary shaft is inserted through the rotary electric machine housing portion and protrudes from the first end wall portion to the one axial end side,
the electrical unit is disposed outside the peripheral wall portion of the rotary electric machine housing portion when viewed from the axial direction and disposed at a position at which at least a part of the electrical unit overlaps the rotary electric machine housing portion when viewed from a direction orthogonal to the axial direction,
the electrical unit includes a protrusion, the protrusion, when viewed from the axial direction, protruding outward from one end portion of the rotary electric machine housing portion in a second direction orthogonal to a first direction, the first direction being a direction in which the electrical unit is disposed with respect to the rotary electric machine housing portion, and
the cooling unit includes:
a cooling fan configured to generate cooling air; and
an air guide unit configured to guide the cooling air, wherein
the cooling fan is provided on an axially outer side of the one axial end side of the rotary electric machine housing portion and configured to rotate integrally with the rotary shaft, and
the air guide unit includes cooling air flow paths provided between the cooling fan and the electrical unit when viewed from the axial direction, wherein
the cooling air flow paths include introduction ports opened toward the cooling fan and discharge ports opened toward the electrical unit when viewed from the axial direction,
the closer to the protrusion of the electrical unit a cooling air flow path is disposed, the larger opening area of the introduction port the cooling air flow path has,
the cooling air flow paths are disposed side by side between the cooling fan and the electrical unit in a circumferential direction of the cooling fan when viewed from the axial direction,
introduction directions of the cooling air at respective introduction ports incline away from the protrusion along the second direction with respect to the first direction, and
inclinations of the introduction directions get larger in an order of arrangement of the cooling air flow paths along the circumferential direction of the cooling fan.

2. The electric power unit according to claim 1, wherein each of the cooling air flow paths is formed such that, when viewed from the axial direction, a discharge direction of the cooling air at the discharge port is oriented in a direction more approaching to the protrusion in the second direction than an introduction direction of the cooling air at the introduction port.

3. The electric power unit according to claim 1, wherein the air guide unit includes at least one partition wall extending in the axial direction such that at least a part of the partition wall overlaps the cooling fan when viewed from the direction orthogonal to the axial direction and partitioning two adjacent cooling air flow paths in the circumferential direction, when viewed from the axial direction, the at least one partition wall includes:
- an introduction wall portion having a radially inner end portion forming the introduction port of the cooling air flow path and extend linearly; and
- a discharge wall portion extending, in a bending or curving form, from a radially outer end portion of the introduction wall portion in a direction approaching the protrusion with respect to the introduction wall portion, a radially outer end portion of the discharge wall portion forming the discharge port of the cooling air flow path, and the introduction wall portion is provided when viewed from the axial direction such that, at an intersection point of a virtual straight line extending along the introduction wall portion and a rotation trajectory of an outermost diameter portion of the cooling fan, an angle formed by the virtual straight line and a tangent line of the rotation trajectory extending from the intersection point toward a rotation direction of the rotor in the circumferential direction is a predetermined angle from the tangent line in a direction opposite to the rotation direction of the rotor in the circumferential direction.

4. The electric power unit according to claim 3, wherein the at least one partition wall includes a plurality of partition walls disposed side by side in the circumferential direction, the air guide unit includes three or more of the cooling air flow paths disposed side by side in the circumferential direction between the cooling fan and the electrical unit when viewed from the axial direction, and the introduction wall portions of the plurality of partition walls are provided such that angles formed by the introduction wall portions are the same predetermined angle.

5. The electric power unit according to claim 1, further comprising:
a first air guide member configured to guide the cooling air discharged from the air guide unit, wherein
the first air guide member extends, when viewed from the axial direction, between the rotary electric machine housing portion and the electrical unit such that at least a part of the first air guide member overlaps the protrusion in the second direction at a position overlapping the discharge port of the cooling air flow path.

6. The electric power unit according to claim 5, wherein
a plurality of heat dissipation ribs are provided on an outer surface of the peripheral wall portion of the rotary electric machine housing portion, the heat dissipation ribs protruding outward in a radial direction of the rotary electric machine and extending in the axial direction,
a plurality of heat dissipation fins extending in the axial direction and the first direction are provided on a facing surface of the electrical unit facing the rotary electric machine unit, and
the first air guide member extends in the first direction and the second direction.

7. The electric power unit according to claim 6, wherein
an inter-fin flow path extending in the axial direction is formed between two adjacent heat dissipation fins,
a shielding wall portion is provided at an end portion of the one axial end side of the inter-fin flow path, the shielding wall portion connecting the two adjacent heat dissipation fins and extending in the first direction, and
an end portion of the another axial end side of the inter-fin flow path is opened toward the another axial end side.

8. The electric power unit according to claim 5, further comprising:
a second air guide member configured to guide the cooling air that has passed through the first air guide member, wherein
the second air guide member is disposed between the first air guide member and an end portion of the another axial end side of the electrical unit, and extends in the first direction.

* * * * *